(12) United States Patent
Rofougaran et al.

(10) Patent No.: US 11,705,638 B2
(45) Date of Patent: *Jul. 18, 2023

(54) LENS-ENHANCED COMMUNICATION DEVICE

(71) Applicant: Movandi Corporation, Irvine, CA (US)

(72) Inventors: Ahmadreza Rofougaran, Newport Beach, CA (US); Alfred Grau Besoli, Irvine, CA (US); Seunghwan Yoon, Irvine, CA (US); Farid Shirinfar, Granada Hills, CA (US); Sam Gharavi, Irvine, CA (US); Michael Boers, South Turramurra (AU); Maryam Rofougaran, Rancho Palos Verdes, CA (US); Enver Adas, Newport Beach, CA (US); Kartik Sridharan, San Diego, CA (US)

(73) Assignee: Movandi Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/382,398

(22) Filed: Jul. 22, 2021

(65) Prior Publication Data

US 2021/0351516 A1  Nov. 11, 2021

Related U.S. Application Data

(63) Continuation of application No. 16/233,044, filed on Dec. 26, 2018, now Pat. No. 11,145,986.

(51) Int. Cl.
*H01Q 15/02* (2006.01)
*H01Q 3/26* (2006.01)
(Continued)

(52) U.S. Cl.
CPC ............ *H01Q 15/02* (2013.01); *H01Q 1/36* (2013.01); *H01Q 3/2658* (2013.01); *H01Q 19/062* (2013.01); *H01Q 21/065* (2013.01)

(58) Field of Classification Search
CPC .......... H01Q 15/02; H01Q 15/08; H01Q 1/36; H01Q 3/2658; H01Q 19/062; H01Q 21/065
See application file for complete search history.

(56) References Cited

U.S. PATENT DOCUMENTS 5,724,337 A  3/1998  Kawano et al.
6,731,904 B1  5/2004  Judd
(Continued)

OTHER PUBLICATIONS

Corrected Notice of Allowance for U.S. Appl. No. 16/920,191 dated Feb. 15, 2022.
(Continued)

*Primary Examiner* — Awat M Salih
(74) *Attorney, Agent, or Firm* — Chip Law Group

(57) ABSTRACT

A communication device includes a first lens, a feeder array, and control circuitry communicatively coupled to the feeder array. The first lens is associated with a defined shape, which further exhibits a defined distribution of dielectric constant. The feeder array includes a plurality of antenna elements that are positioned in proximity to the first lens. The control circuitry equalizes a distribution of a gain from the received first lens-guided beam of input RF signals across the feeder array and different scan directions of the plurality of antenna elements. The equalized distribution of gain is based on the defined distribution of dielectric constant within the first lens and the proximity of the feeder array to the first lens.

26 Claims, 19 Drawing Sheets

(51) Int. Cl.
*H01Q 1/36* (2006.01)
*H01Q 19/06* (2006.01)
*H01Q 21/06* (2006.01)

(56) References Cited

U.S. PATENT DOCUMENTS

| | | | |
|---|---|---|---|
| 7,079,079 | B2 | 7/2006 | Jo et al. |
| 7,363,058 | B2 | 4/2008 | Gustaf |
| 7,675,465 | B2 | 3/2010 | Doan et al. |
| 7,679,576 | B2 | 3/2010 | Riedel et al. |
| 7,715,466 | B1 | 5/2010 | Oh et al. |
| 9,130,262 | B2 | 9/2015 | Park et al. |
| 9,178,546 | B1 | 11/2015 | Klemes |
| 10,080,274 | B2 | 9/2018 | Johnson |
| 10,103,853 | B2 | 10/2018 | Moshfeghi |
| 10,199,717 | B2 | 2/2019 | Rofougaran et al. |
| 10,320,090 | B2 | 6/2019 | Zou et al. |
| 10,389,041 | B2 | 8/2019 | Yoon et al. |
| 10,854,995 | B2 | 12/2020 | Rofougaran et al. |
| 10,965,411 | B2 | 3/2021 | Moshfeghi |
| 11,018,816 | B2 | 5/2021 | Moshfeghi |
| 11,056,764 | B2 | 7/2021 | Rofougaran et al. |
| 11,075,724 | B2 | 7/2021 | Moshfeghi |
| 11,088,756 | B2 | 8/2021 | Gharavi et al. |
| 11,128,415 | B2 | 9/2021 | Moshfeghi |
| 11,342,968 | B2 | 5/2022 | Yoon et al. |
| 11,394,128 | B2 | 7/2022 | Rofougaran et al. |
| 2004/0204114 | A1 | 10/2004 | Brennan et al. |
| 2005/0088260 | A1 | 4/2005 | Ajioka et al. |
| 2005/0134517 | A1 | 6/2005 | Gottl |
| 2005/0136943 | A1 | 6/2005 | Banerjee et al. |
| 2006/0040615 | A1 | 2/2006 | Mohamadi |
| 2006/0063487 | A1 | 3/2006 | Cleveland et al. |
| 2006/0170595 | A1 | 8/2006 | Gustaf |
| 2007/0001924 | A1 | 1/2007 | Hirabayashi |
| 2008/0207259 | A1 | 8/2008 | Rofougaran |
| 2009/0046624 | A1 | 2/2009 | Martinez et al. |
| 2009/0066590 | A1 | 3/2009 | Yamada et al. |
| 2009/0156227 | A1 | 6/2009 | Frerking et al. |
| 2009/0175214 | A1 | 7/2009 | Star et al. |
| 2010/0159859 | A1 | 6/2010 | Rofougaran |
| 2010/0167639 | A1 | 7/2010 | Ranson et al. |
| 2010/0284446 | A1 | 11/2010 | Mu et al. |
| 2011/0109507 | A1 | 5/2011 | Warnick |
| 2011/0159801 | A1 | 6/2011 | Maltsev et al. |
| 2011/0190005 | A1 | 8/2011 | Cheon et al. |
| 2011/0294415 | A1 | 12/2011 | Jeon et al. |
| 2012/0003925 | A1 | 1/2012 | Coldrey et al. |
| 2012/0149300 | A1 | 6/2012 | Forster |
| 2013/0003645 | A1 | 1/2013 | Shapira et al. |
| 2013/0034128 | A1 | 2/2013 | Gore et al. |
| 2013/0039342 | A1 | 2/2013 | Kazmi |
| 2013/0122802 | A1 | 5/2013 | Wang et al. |
| 2013/0149300 | A1 | 6/2013 | Hiatt et al. |
| 2014/0104124 | A1 | 4/2014 | Chernokalov et al. |
| 2015/0296344 | A1 | 10/2015 | Trojer et al. |
| 2015/0340765 | A1 | 11/2015 | Dang et al. |
| 2016/0049723 | A1 | 2/2016 | Baks et al. |
| 2016/0056946 | A1 | 2/2016 | Moher |
| 2016/0204513 | A1 | 7/2016 | Yemelong et al. |
| 2016/0359230 | A1 | 12/2016 | Wang et al. |
| 2017/0324171 | A1* | 11/2017 | Shehan ............... H01Q 5/30 |
| 2017/0353338 | A1 | 12/2017 | Amadjikpe et al. |
| 2018/0063139 | A1 | 3/2018 | Day et al. |
| 2018/0191062 | A1 | 7/2018 | Ndip et al. |
| 2018/0231651 | A1* | 8/2018 | Charvat ............... G01S 7/282 |
| 2018/0269576 | A1 | 9/2018 | Scarborough et al. |
| 2018/0316090 | A1* | 11/2018 | Foo .................. H01Q 15/002 |
| 2019/0020399 | A1* | 1/2019 | Coutts ................ H01Q 3/2605 |
| 2019/0020407 | A1 | 1/2019 | Gharavi et al. |
| 2019/0089069 | A1 | 3/2019 | Niroo et al. |
| 2019/0139914 | A1 | 5/2019 | Kirino et al. |
| 2019/0230626 | A1 | 7/2019 | Rune et al. |
| 2019/0297648 | A1 | 9/2019 | Nagaraja et al. |
| 2019/0334253 | A1 | 10/2019 | Corman et al. |
| 2020/0036414 | A1 | 1/2020 | Shattil |
| 2020/0185299 | A1 | 6/2020 | Chang et al. |
| 2020/0322016 | A1 | 10/2020 | Kim et al. |
| 2021/0058140 | A1 | 2/2021 | Schwab et al. |
| 2021/0109145 | A1 | 4/2021 | Haustein et al. |
| 2021/0203085 | A1 | 7/2021 | Jordan et al. |

OTHER PUBLICATIONS

Corrected Notice of Allowance for U.S. Appl. No. 17/091,520 dated Feb. 2, 2022.
Corrected Notice of Allowance for U.S. Appl. No. 17/091,520 dated Jan. 28, 2022.
Corrected Notice of Allowance for U.S. Appl. No. 17/091,520 dated Mar. 17, 2022.
Final Office Action for U.S. Appl. No. 17/011,042 dated Mar. 14, 2022.
Non-Final Office Action for U.S. Appl. No. 17/004,373 dated Feb. 15, 2022.
Non-Final Office Action for U.S. Appl. No. 17/060,182 dated Feb. 25, 2022.
Non-Final Office Action for U.S. Appl. No. 17/208,984 dated Apr. 12, 2022.
Non-Final Office Action for U.S. Appl. No. 17/230,566 dated Apr. 12, 2022.
Notice of Allowance for U.S. Appl. No. 16/920,191 dated Feb. 2, 2022.
Notice of Allowance for U.S. Appl. No. 17/171,521 dated Apr. 6, 2022.
Corrected Notice of Allowance for U.S. Appl. No. 16/920,191 dated Jun. 22, 2022.
Corrected Notice of Allowance for U.S. Appl. No. 16/920,191 dated May 10, 2022.
Corrected Notice of Allowance for U.S. Appl. No. 16/920,191 dated May 18, 2022.
Corrected Notice of Allowance for U.S. Appl. No. 16/935,422 dated Jun. 8, 2022.
Corrected Notice of Allowance for U.S. Appl. No. 16/935,515 dated Jun. 8, 2022.
Corrected Notice of Allowance for U.S. Appl. No. 17/091,520 dated Apr. 26, 2022.
Corrected Notice of Allowance for U.S. Appl. No. 17/171,521 dated Jul. 7, 2022.
Corrected Notice of Allowance for U.S. Appl. No. 17/171,521 dated Jul. 13, 2022.
Final Office Action for U.S. Appl. No. 16/927,225 dated Jun. 24, 2022.
Non-Final Office Action for U.S. Appl. No. 17/011,042 dated Jul. 1, 2022.
Non-Final Office Action for U.S. Appl. No. 17/243,747 dated Jun. 6, 2022.
Notice of Allowance for U.S. Appl. No. 16/935,515 dated Jun. 1, 2022.
Notice of Allowance for U.S. Appl. No. 17/004,373 dated May 23, 2022.
Notice of Allowance for U.S. Appl. No. 17/329,276 dated Jun. 28, 2022.
Notice of Allowance for U.S. Appl. No. 16/935,422 dated May 31, 2022.
Notice of Allowance for U.S. Appl. No. 17/060,182 dated Jun. 8, 2022.
Notice of Allowance for U.S. Appl. No. 17/337,529 dated May 4, 2022.
Corrected Notice of Allowance for U.S. Appl. No. 16/233,044 dated Sep. 10, 2021.
Corrected Notice of Allowance for U.S. Appl. No. 16/377,847 dated Aug. 20, 2021.
Corrected Notice of Allowance for U.S. Appl. No. 16/388,043 dated Aug. 27, 2021.
Corrected Notice of Allowance for U.S. Appl. No. 16/391,628 dated Jul. 30, 2021.
Corrected Notice of Allowance for U.S. Appl. No. 16/398,156 dated Aug. 13, 2021.

(56) References Cited

OTHER PUBLICATIONS

Non-Final Office Action for U.S. Appl. No. 16/920,191 dated Oct. 15, 2021.
Supplemental Notice of Allowance for U.S. Appl. No. 16/451,980 dated Aug. 6, 2021.
Supplemental Notice of Allowance for U.S. Appl. No. 16/866,536 dated Jul. 21, 2021.
Supplemental Notice of Allowance for U.S. Appl. No. 16/941,690 dated Aug. 9, 2021.
Corrected Notice of Allowance for U.S. Appl. No. 16/398,156 dated Nov. 17, 2021.
Corrected Notice of Allowance for U.S. Appl. No. 17/091,520 dated Dec. 14, 2021.
Non-Final Office Action for U.S. Appl. No. 16/927,225 dated Dec. 22, 2021.
Non-Final Office Action for U.S. Appl. No. 16/935,422 dated Jan. 21, 2022.
Non-Final Office Action for U.S. Appl. No. 16/935,515 dated Jan. 21, 2022.
Non-Final Office Action for U.S. Appl. No. 17/011,042 dated Oct. 29, 2021.
Non-Final Office Action for U.S. Appl. No. 17/337,529 dated Jan. 26, 2022.
Notice of Allowance for U.S. Appl. No. 17/091,520 dated Oct. 27, 2021.
Corrected Notice of Allowance for U.S. Appl. No. 16/935,422 dated Oct. 17, 2022.
Corrected Notice of Allowance for U.S. Appl. No. 16/935,422 dated Sep. 14, 2022.
Corrected Notice of Allowance for U.S. Appl. No. 16/935,515 dated Oct. 17, 2022.
Corrected Notice of Allowance for U.S. Appl. No. 16/935,515 dated Sep. 14, 2022.
Corrected Notice of Allowance for U.S. Appl. No. 17/171,521 dated Aug. 29, 2022.
Corrected Notice of Allowance for U.S. Appl. No. 17/329,276 dated Oct. 11, 2022.
Corrected Notice of Allowance for U.S. Appl. No. 17/337,529 dated Aug. 3, 2022.
Corrected Notice of Allowance for U.S. Appl. No. 17/337,529 dated Oct. 5, 2022.
Final Office Action for U.S. Appl. No. 17/011,042 dated Oct. 7, 2022.
Non-Final Office Action for U.S. Appl. No. 17/209,030 dated Oct. 14, 2022.
Non-Final Office Action for U.S. Appl. No. 17/230,696 dated Oct. 6, 2022.
Non-Final Office Action for U.S. Appl. No. 17/377,983 dated Oct. 26, 2022.
Non-Final Office Action for U.S. Appl. No. 17/408,606 dated Aug. 16, 2022.
Non-Final Office Action for U.S. Appl. No. 17/536,235 dated Oct. 11, 2022.
Non-Final Office Action for U.S. Appl. No. 17/742,648 dated Oct. 5, 2022.
Notice of Allowability for U.S. Appl. No. 17/337,529 dated Aug. 10, 2022.
Notice of Allowability for U.S. Appl. No. 17/004,373 dated Aug. 17, 2022.
Notice of Allowability for U.S. Appl. No. 17/004,373 dated Aug. 31, 2022.
Notice of Allowability for U.S. Appl. No. 17/004,373 dated Oct. 24, 2022.
Notice of Allowability for U.S. Appl. No. 17/060,182 dated Aug. 19, 2022.
Notice of Allowability for U.S. Appl. No. 17/060,182 dated Oct. 20, 2022.
Notice of Allowability for U.S. Appl. No. 17/060,182 dated Sep. 20, 2022.
Notice of Allowance for U.S. Appl. No. 16/927,225 dated Oct. 3, 2022.
Notice of Allowance for U.S. Appl. No. 17/208,984 dated Aug. 16, 2022.
Notice of Allowance for U.S. Appl. No. 17/230,566 dated Aug. 25, 2022.
Notice of Allowance for U.S. Appl. No. 17/243,747 dated Sep. 27, 2022.
Notice of Allowance for U.S. Appl. No. 17/365,037 dated Aug. 10, 2022.
Corrected Notice of Allowance for U.S. Appl. No. 16/927,225 dated Feb. 1, 2023.
Corrected Notice of Allowance for U.S. Appl. No. 16/927,225 dated Nov. 23, 2022.
Corrected Notice of Allowance for U.S. Appl. No. 17/329,276 dated Nov. 23, 2022.
Corrected Notice of Allowance for U.S. Appl. No. 17/337,529 dated Nov. 10, 2022.
Corrected Notice of Allowance for U.S. Appl. No. 17/365,037 dated Jan. 5, 2023.
Corrected Notice of Allowance for U.S. Appl. No. 17/365,037 dated Nov. 15, 2022.
Corrected Notice of Allowance for U.S. Appl. No. 17/365,037 dated Nov. 25, 2022.
Corrected Notice of Allowance for U.S. Appl. No. 17/742,648 dated Feb. 1, 2023.
Corrected Notice of Allowance for U.S. Appl. No. 17/208,984 dated Nov. 23, 2022.
Delete This Duplicate Reference—Notice of Allowance for U.S. Appl. No. 17/230,696 dated Jan. 20, 2023.
Non-Final Office Action for U.S. Appl. No. 17/887,672 dated Dec. 6, 2022.
Non-Final Office Action for U.S. Appl. No. 17/396,063 dated Jan. 18, 2023.
Non-Final Office Action for U.S. Appl. No. 17/408,583 dated Nov. 4, 2022.
Notice of Allowability for U.S. Appl. No. 17/230,566 dated Feb. 2, 2023.
Notice of Allowability for U.S. Appl. No. 17/243,747 dated Dec. 2, 2022.
Notice of Allowability for U.S. Appl. No. 17/243,747 dated Jan. 5, 2023.
Notice of Allowance for U.S. Appl. No. 17/230,696 dated Jan. 20, 2023.
Notice of Allowance for U.S. Appl. No. 17/408,606 dated Feb. 1, 2023.
Notice of Allowance for U.S. Appl. No. 17/742,648 dated Jan. 25, 2023.
Notice of Allowance for U.S. Appl. No. 17/863,874 dated Nov. 18, 2022.
Notice of Allowance for U.S. Appl. No. 17/946,734 dated Jan. 30, 2023.
Supplemental Notice of Allowability for U.S. Appl. No. 17/208,984 dated Nov. 10, 2022.
Supplemental Notice of Allowance for U.S. Appl. No. 17/208,984 dated Jan. 5, 2023.
Supplemental Notice of Allowance for U.S. Appl. No. 17/230,566 dated Jan. 5, 2023.
Final Office Action for U.S. Appl. No. 17/377,983 dated Feb. 10, 2023.
Final Office Action for U.S. Appl. No. 17/887,672 dated Mar. 30, 2023.
Non-Final Office Action for U.S. Appl. No. 17/011,042 dated Feb. 3, 2023.
Non-Final Office Action for U.S. Appl. No. 17/898,706 dated Mar. 28, 2023.
Non-Final Office Action for U.S. Appl. No. 17/903,092 dated Feb. 16, 2023.
Non-Final Office Action for U.S. Appl. No. 17/903,130 dated Feb. 27, 2023.
Notice of Allowance for U.S. Appl. No. 17/208,893 dated Mar. 8, 2023.

(56) References Cited

OTHER PUBLICATIONS

Notice of Allowance for U.S. Appl. No. 17/209,030 dated Feb. 8, 2023.
Notice of Allowance for U.S. Appl. No. 17/377,983 dated Apr. 19, 2023.
Notice of Allowance for U.S. Appl. No. 17/408,583 dated Feb. 27, 2023.
Notice of Allowance for U.S. Appl. No. 17/536,235 dated Feb. 15, 2023.
Notice of Allowance for U.S. Appl. No. 17/978,565 dated Mar. 17, 2023.
Final Office Action for U.S. Appl. No. 17/011,042 dated May 12, 2023.
Notice of Allowance for U.S. Appl. No. 17/396,063 dated May 26, 2023.

* cited by examiner

LENS-ENHANCED COMMUNICATION DEVICE

CROSS-REFERENCE TO RELATED APPLICATIONS/INCORPORATION BY REFERENCE

This patent application makes reference to, claims priority to, claims the benefit of, and is a continuation application of U.S. patent application Ser. No. 16/233,044 filed on Dec. 26, 2018.

This application makes reference to U.S. patent application Ser. No. 15/335,034 on filed Oct. 26, 2016, now U.S. Pat. No. 10,256,537.

FIELD OF TECHNOLOGY

Certain embodiments of the disclosure relate to a millimeter wave-enabled communication device. More specifically, certain embodiments of the disclosure relate to a communication device and method for lens-based enhancement of RF signals.

BACKGROUND

Recent developments in RF communication systems have created a demand to mitigate a lower power reception of Lens-Enhanced Phase-Array (LEPA) RF receivers that employ a combination of a lens and phase-array antennas to capture excitation from incident RF signals. As reception of adequate power is critical in establishing reliable wireless communications, the lower power reception creates a bottleneck for reliable communication for devices that communicate in accordance with 4G and 5G communication standards. The LEPA configuration for receivers has gained traction in recent years due to numerous advantages, such as wide scan angles, selectively beam steering and increase gain and phase control over incident RF signals. The power received by a phased array antenna panel can be increased by proper beamforming and also by increasing the area of the array and the number of antennas residing in the array. However, due to space limitations, this approach can increase the size of the receiver, and thus, make such implementation impractical for communication devices that require thinner form factor. The power distribution in the LEPA configurations is traditionally non-uniformly distributed over phase-array antennas. Such non-uniform power distribution create bottlenecks while measuring power levels from the phase-array antennas. Additionally, as the phase-array elements are traditionally separated by a distance that is equal to the focal length of the lens. Therefore, every phase-array element has to be discretely scanned to measure and capture adequate power at different scan angles. Such discretized scans leads to overall delay in power measurement, capture, and processing time, which affects the operation of the device that implements such receiver configuration.

Further limitations and disadvantages of conventional and traditional approaches will become apparent to one skill in the art, through comparison of such systems with some aspects of the present disclosure as set forth in the remainder of the present application with reference to the drawings.

BRIEF SUMMARY OF THE DISCLOSURE

Devices and/or methods are provided for a lens-based enhancement of input RF signals, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and a communication device for lens-based enhancement of RF signals. The disclosed method and the communication device provides a solution to improve power gain (or transmit power) for a received (or a transmitted) beam of RF signals without an increase in the area of a feeder array or a number of antenna elements in the feeder array provided in the communication device. Different lens configurations, with different shapes, sizes and geometries, or permittivity profiles may advantageously facilitate a beam scan at wider angles and a beam steering for desired regions of the feeder array. This further facilitates equalized distribution of received RF power from RF signals at the feeder array of a receiver and/or transmitter of the communication device. The disclosed LEPA configuration of the receiver and/or the transmitter may further facilitate robust communication for millimeter wave enabled devices at frequency bands and data rates that support the "4G", "5G" or higher (nG) standards. The proximity of a first lens and the feeder array in the LEPA configuration may further render a thinner form-factor for the receiver and the communication device, which may advantageously reduce a size of the receiver and/or transmitter for the communication device and further mitigate design constraints for such receivers that are capable of millimeter wave communication, for example, 5G communication. By use of phase array antennas with such proximity to the feeder array, a continuous scan for excitations from the beam of RF signals can be done at the feeder array instead of a discretized scan for each individual antenna element observed in current solutions. In the following description, reference is made to the accompanying drawings, which forms a part hereof, and in which is shown, by way of illustration, various embodiments of the present disclosure.

Figure 1A:
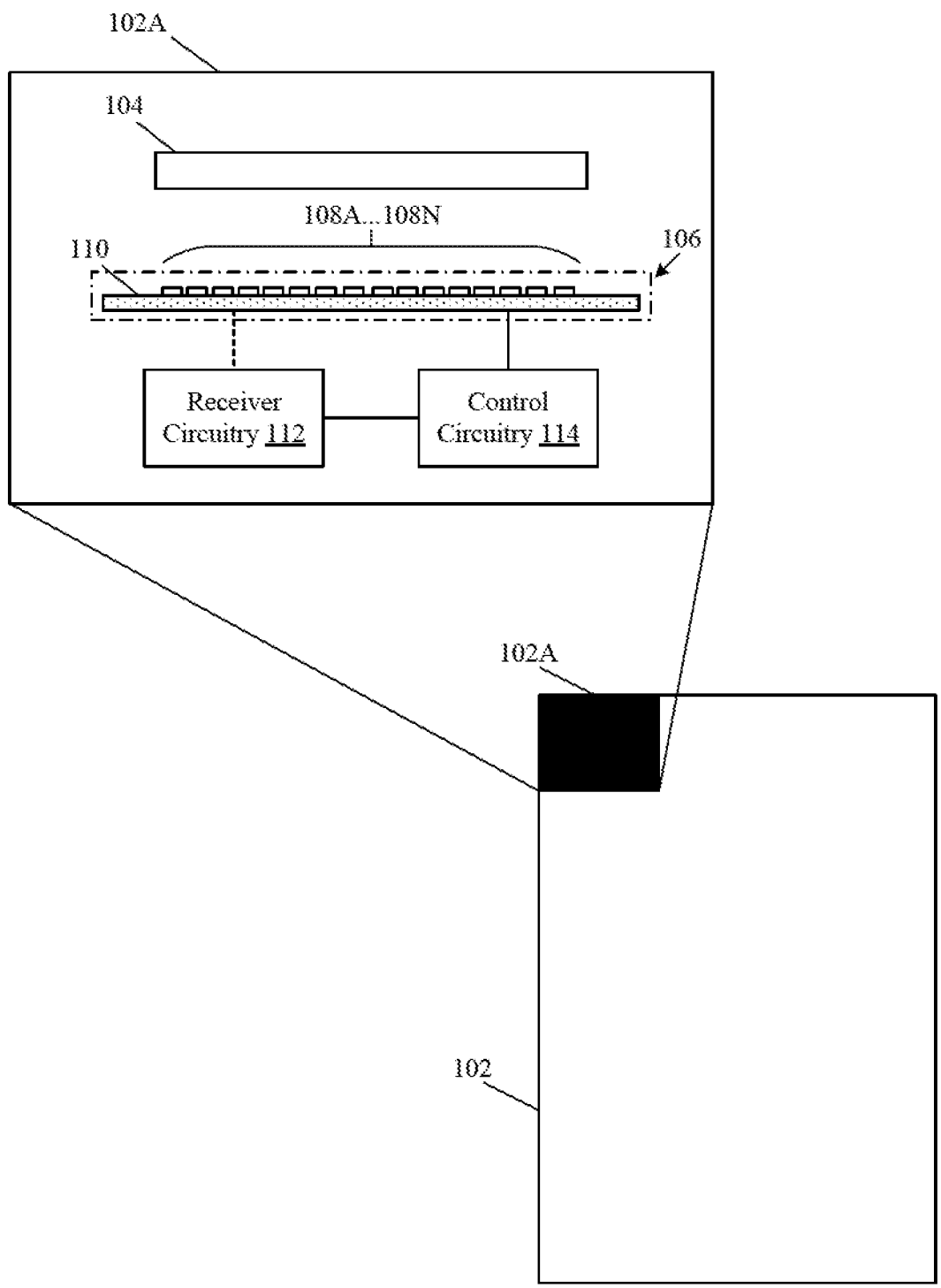
FIGS. 1A, 1B, 1C, and 1D, collectively, illustrate an exemplary communication device having an exemplary arrangement of a lens-based feeder array, in accordance with an exemplary embodiment of the disclosure.

FIGS. 1A, 1B, 1C, and 1D, collectively, illustrate an exemplary communication device having an exemplary arrangement of a lens-based feeder array, in accordance with an exemplary embodiment of the disclosure. With reference to FIG. 1A, there is shown a communication device 102 that comprises a receiver 102A, which may further comprise a first lens 104, a feeder array 106, a receiver circuitry 112, and control circuitry 114. The feeder array 106 may be electrically coupled to the receiver circuitry 112 and the control circuitry 114.

The communication device 102 may be configured to receive a beam of input radio frequency (RF) signals from one or more defined signal sources, such as a base-station and a RF repeater. The beam of input RF signals may be received at the receiver 102A of the communication device 102. The communication device 102 may be a wireless signal processing device that may be configured to execute one or more operations on the received beam of input RF signals. Examples of the one or more operations may include, but are not limited to, amplification, de-amplification, denoising, sampling, quantization, error-correction, encoding, decoding, signal boosting, A/D conversion, D/A conversion, and TX/RX of the beam of input RF signals. Examples of the communication device 102 may include, but are not limited to, a 4th Generation (4G) smartphone, a 5th Generation (5G) smart-phone, a 4G Long Term Evolution (LTE) smartphone, a 4G RF repeater, a 5G RF repeater, a 4G-enabled base transceiver station (BTS), a 5G-enabled BTS, and a customer premise equipment (CPE) in a home network.

The receiver 102A may be configured to receive and process the beam of input RF signals, incident at an incident angle with respect to a plane of the receiver 102A of the communication device 102. In some cases, the receiver 102A may be configured to receive and process multiple beams incident at multiple incident angles with respect to the plane of the receiver 102A. As shown, the receiver 102A may be present in a specific region of the communication device 102 and may be associated with a specific form factor and package configuration. Examples of the package configuration may include, but are not limited to, System on Chip (SoC)-based configuration, Field programmable gate arrays (FPGA)-based configuration, complex programmable logic device (CPLD)-based configuration, System in package (SiP)-based configuration, and Programmable System on Chip (PSoC)-based configuration. The receiver 102A may be implemented as a Multiple-Input and Multiple-Output (MIMO) receiver for millimeter wave communications. Such MIMO configuration of the receiver 102A may be further based on a lens-enhanced phased array (LEPA) configuration. The LEPA configuration of the receiver 102A may further include a single lens or a lens array of a plurality of lenses with the feeder array 106. Examples of the receiver 102A may include, but are not limited to, a 4G RF receiver, a 4G LTE RF receiver, and a 5G RF receiver, or a receiver of a CPE.

The first lens 104 may be designed to guide the beam of input RF signals, incident at an incident angle with respect to an optical axis of the first lens 104. The beam of input RF signals may be guided by the first lens 104 across the feeder array 106. The first lens 104 may be associated with a defined shape and may have a defined distribution of dielectric constant. Such defined shape and the distribution of the dielectric constant may be adjusted to equalize a distribution of a gain from the received input beam of RF signals across the feeder array 106. The defined shape of the first lens 104 may be one of a squared lens shape, a rectangular lens shape, or an arbitrary lens shape. The first lens 104 may be associated with lens characteristics, which may correspond to at least one of a geometry profile, a dielectric profile (or a permittivity profile), a refractive index profile, and a radiation profile. The geometry profile of the first lens 104 may correspond to a physical configuration based on a thickness, a length, a beam-diameter, a radius of curvature, and an arrangement of at least one aperture of the first lens 104. The dielectric profile of the first lens 104 may correspond to a distribution of dielectric constant within the first lens 104. The dielectric profile may be based on at least a dielectric constant, a permittivity, and a variation in concentration of at least one dielectric material in at least one region of the first lens 104. Similarly, the refractive index profile of the first lens 104 may correspond to a distribution of refractive index along a radial, a principal, or a defined plane of the first lens 104. With variations in profile parameters, different lens configurations can be obtained to achieve control over gain equalization, signal energy spread out, phase, and steering angles for different beams of input RF signals. Some of such lens configurations have been illustrated as an example, in FIGS. 3A to 3F.

The feeder array 106 may be configured to receive (or transmit) a first lens-steered beam of input RF signals steered via the first lens 104. The feeder array 106 may correspond to a phased array antenna panel, which may include a plurality of patches of antenna elements, arranged in arrays of "N×M" dimensions in one or more planes, where N and M may be a number of antenna elements in a row and a column of a substrate 110, respectively. The feeder array 106 may be positioned proximally to the first lens 104 to receive the first lens-steered beam of input RF signals through the first lens 104. Such proximal arrangement of the first lens 104 and the feeder array 106 may further establish a thinner configuration of the receiver 102A as compared to existing solutions for RF signal enhancements for a conventional receiver, for example, for 4G/5G (millimeter wave) communication.

The feeder array 106 may be part of a front-end circuitry, which may be further configured to directly receive the beam of input RF signals guided through the first lens 104. The feeder array 106 may include a plurality of antenna elements 108A . . . 108N on the substrate 110 of the feeder array 106. The plurality of antenna elements 108A . . . 108N may further be associated with the receiver circuitry 112 (and/or a transmitter circuitry (See FIG. 2A)) that may include a plurality of phase shifters, and various amplifiers electrically coupled to the plurality of antenna elements 108A . . . 108N of the feeder array 106 (as shown, for example, in FIG. 1C and FIGS. 2A and 2B). In accordance with an embodiment, the plurality of antenna elements 108A . . . 108N may correspond to a micro-strip antenna element, printed on the substrate 110, for example, Silicon, Benzocyclobutane, Nylon, FR-4, and the like.

The receiver circuitry 112 may be further configured to receive an electrical power signal for the received beam of input RF signals from the feeder array 106. The received electrical power signal may be received by a plurality of front-end RF components 112A . . . 112N of the receiver circuitry 112 from each antenna element or patches of the plurality of antenna elements 108A . . . 108N of the feeder array 106, via electrical buses. The receiver circuitry 112 may be a part of the RF front-end circuitry and such receiver circuitry 112 may be implemented as an embedded circuitry on the substrate 110 such that each of the plurality of front-end RF components 112A . . . 112N of the receiver circuitry 112 may include at least one of a low noise amplifier (LNA), a phase-shifter (PS) and a variable gain amplifier (VGA), electrically coupled to one or more one antenna elements of the plurality of antenna elements 108A . . . 108N.

In some embodiments, each antenna element of the plurality of antenna elements 108A . . . 108N of the feeder array 106 may be connected with a specific front-end RF component of the receiver circuitry 112. In some other embodiments, one or more antenna elements may be configured in a sub-array or a patch and each sub-array or patch of antenna elements may be electrically coupled with a specific front-end RF component of the receiver circuitry 112, such as 4×4 patch of antenna elements coupled with an RF front-end component that includes the PS and the LNA.

The control circuitry 114 may be a master control chip, which may be configured to set a phase-shift of each antenna element and/or each patch of antenna elements of the plurality of antenna elements 108A . . . 108N. The phase-shift may be set to facilitate generation of a beamformed and a phase-controlled power signal from the received beam of input RF signals at the receiver circuitry 112. The control circuitry 114 may be further configured to scan for the received beam of input RF signals at the feeder array 106 and control different parameters (for example, a scanning frequency, a scan angle, and a phase) of the plurality of front-end RF components 112A . . . 112N of the receiver circuitry 112 associated with the plurality of antenna elements 108A . . . 108N of the feeder array 106. The control circuitry 114 may be present on the substrate 110 of the receiver 102A and may be electrically coupled to the receiver circuitry 112 and the feeder array 106, via a plurality of control buses. The control circuitry 114 may facilitate digital beamforming and phase-controlled generation of power signals from the first lens 104 beam of input RF signals at the aperture of the feeder array 106.

Figure 1B:
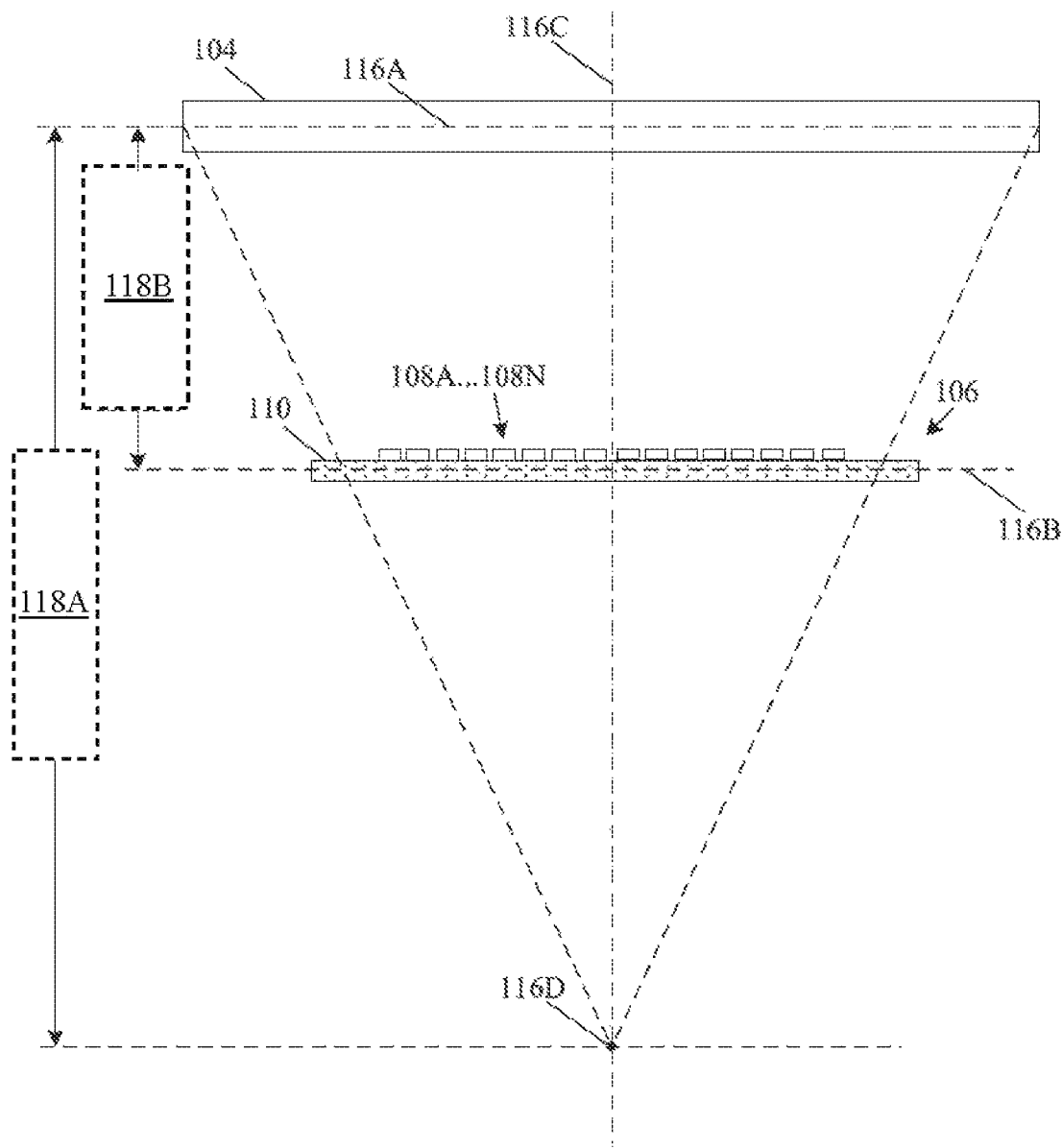

With reference to FIG. 1B, there is shown a geometrical arrangement of the first lens 104 and the feeder array 106 in the LEPA-configuration. Such geometrical arrangement may include an arrangement of the first lens 104 in a principal plane 116A and the feeder array 106 arranged in a plane 116B. The principal plane 116A of the first lens 104 may be parallel to the plane 116B of the feeder array 106. The first lens 104 may be further associated with an optical axis 116C that may be orthogonal to the principal plane 116A of the first lens 104 and the plane 116B of the feeder array 106. A focal point 116D of the first lens 104 may be at a focal length 118A from the principal plane 116A of the first lens 104. The plane 116B of the feeder array 106 may lie at a defined distance 118B from the principal plane 116A of the first lens 104 such that the defined distance 118B may be less than the focal length 118A of the first lens 104. Alternatively, the defined distance may be equal to or greater than the focal length of the first lens 104. The first lens 104 and the feeder array 106 may be positioned along a common axis, such as the optical axis 116C of the first lens 104, in order to facilitate a wide-beam continuous scan of the feeder array 106 of the plurality of antenna elements 108A . . . 108N. In such an implementation, the proximity of the feeder array 106 from the first lens 104 may advantageously render a thinner configuration for the receiver 102A and thus, a thinner configuration for the communication device 102. The first lens 104 may have a design (indicated by a customized permittivity profile or a dielectric profile) that may permit the first lens 104 to facilitate a scan of multiple beams continuously at multiple scan angles and to guide such multi-beams across the feeder array 106. This may enable the feeder array 106 to receive (or transmit) more power per given aperture area of the feeder array 106, as compared to conventional MIMO receivers/transmitters.

Figure 1C:
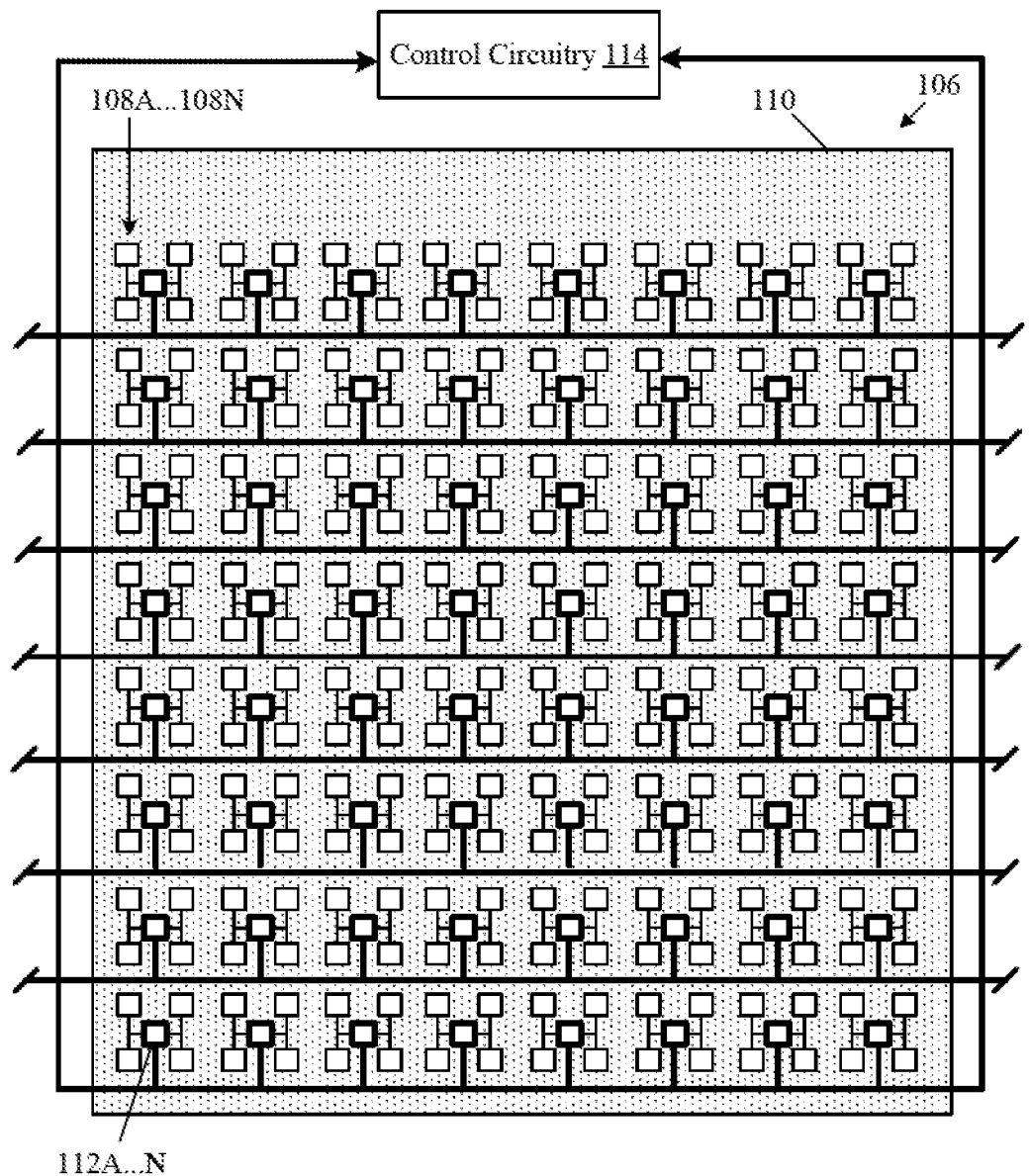

With reference to FIG. 1C, there is shown a RF front-end circuit of the receiver 102A in the communication device 102. The RF front-end circuit includes a plurality of front-end RF components 112A . . . 112N coupled with the plurality of antenna elements 108A . . . 108N of the feeder array 106, and the control circuitry 114 coupled to the plurality of front-end RF components 112A . . . 112N, via one or more electrical buses. The plurality of antenna elements 108A . . . 108N in the feeder array 106 may be arranged into a plurality of patches of antenna elements, such as a "4×4" patch of micro-strip antenna elements fabricated on the substrate 110 of the feeder array 106. Within each patch of antenna elements, each antenna element may be separated from neighboring antenna element in a row and a column of the patch by a specific distance. The specific distance may be less than a wavelength ($\lambda$) of the beam of input RF signals. For example, each antenna element in the patch of antenna elements may be separated by the specific distance of "λ/2". Further, each patch of antenna elements may further include a front-end RF component of the receiver circuitry 112. Each front-end RF component may be configured to set the phase-shift for the corresponding antenna element or the patch of antenna elements and further output an electrical signal from the corresponding patch of the feeder array 106. Each front-end RF component of the receiver circuitry 112 may further be connected to an electrical bus, which may be connected to the control circuitry 114. Such interconnection of several electrical buses for each patch may form parallel bus architecture on the feeder array 106. The control circuitry 114 may further provide control signals to scan for the beam of input RF signals or set the phase of each antenna element of the feeder array 106 by use of the parallel bus architecture of the feeder array 106.

Figure 1D:
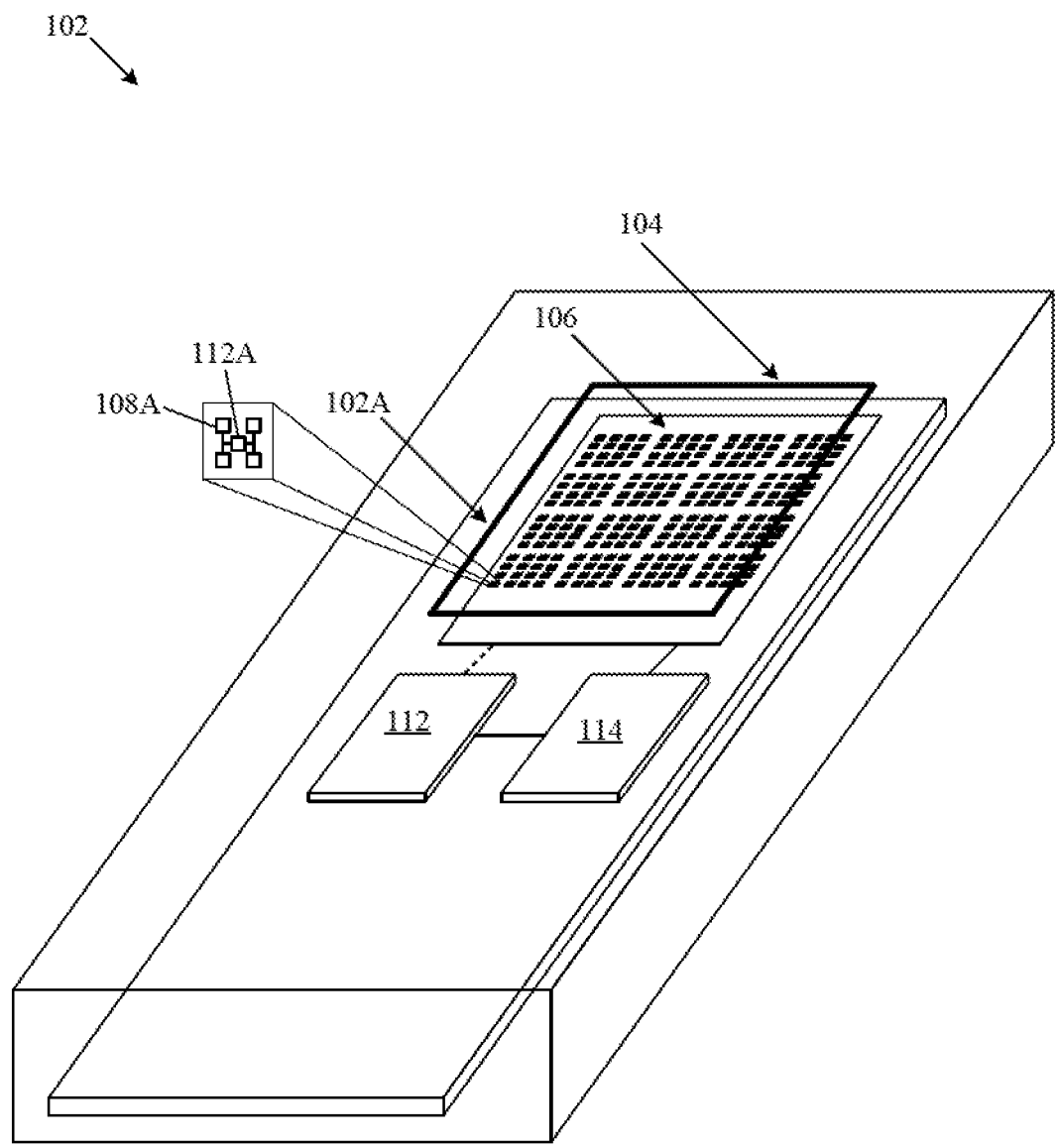

With reference to FIG. 1D, there is shown a perspective view of the communication device 102. The communication device 102 may include the receiver 102A on the substrate 110, such as a printed circuit board. In accordance with an embodiment, the feeder array 106, the receiver circuitry 112, and the control circuitry 114 may be embedded on the substrate of the communication device 102. In other embodiments, the feeder array 106, the receiver circuitry 112, and the control circuitry 114 may be implemented on the substrate 110, which may be different from the substrate of the receiver 102A. In such an implementation, the feeder array 106, the receiver circuitry 112, and the control circuitry 114 may be implemented as an SOC chip on the substrate of the receiver 102A of the communication device 102. In another implementation, the feeder array 106, the receiver circuitry 112, and the control circuitry 114 may be implemented as a Radio Frequency Integrated Circuit (RFIC) chip on the substrate of the receiver 102A of the communication device 102.

The first lens 104 or lens array may be externally or internally integrated within the receiver 102A. Although not shown, the communication device 102 may further include other electrical components, such as a display circuitry, transmitter circuitry, an input/output (I/O) circuitry and a power/charging circuitry. However, such components have not been shown or described for the sake of brevity.

In operation, a beam of input RF signals may be received at the receiver 102A (or transmitted by a transmitter) of the communication device 102. The beam of RF signals may correspond to millimeter-wave communication signals that may be associated with a frequency band of 4G, 4G LTE, 5G, or nG (i.e. nth generation) spectrums. The beam of input RF signals may arrive at the receiver 102A from a specific direction of arrival (DOA), measured in angle(s). The receiver 102A may be designed and configured to enhance the reception of the beam of input RF signals from different angles of incidence (or DOA) of the beam of RF signals. In accordance with an embodiment, the receiver 102A may be implemented in a mobile device, for example, a smartphone device, to facilitate enhanced reception of the beam of input RF signals. In accordance with an embodiment, the receiver 102A may be implemented in a repeater device for enhanced reception and enhanced retransmission of the beam of input RF signals. In accordance with an embodiment, the receiver 102A may be implemented in a base station for enhanced reception of the beam of input RF signals.

Such enhancement of the reception of the beam of input RF signals may be achieved based on utilization of a LEPA configuration, which include a combination of the first lens 104 of a defined shape and a defined distribution of dielectric constant and the feeder array 106 of the plurality of antenna elements 108A . . . 108N. The combination of the first lens 104 and the feeder array 106 may be configured for at least one of a spatial beamforming, a beam scanning, a phase and amplitude control, a beam-guiding and a distribution of radiation pattern of the received beam of input RF signals. Also, the first lens 104 may have a customized permittivity profile (i.e. a combination of a lens shape and a homogenous/inhomogeneous distribution of dielectric/non-dielectric materials in the first lens 104) such that multiple beam incident on the first lens 104 continuously scanned and guided across radiation deficient regions of the feeder array 106 for a desired gain equalization. By using the feeder array 106 together with the first lens 104, i.e. a specifically designed lens, a LEPA configuration is achieved that offers a thinner form factor as a MIMO receiver and/or a MIMO transmitter for use in the communication device 102. Whereas in conventional approaches, an array feeder is placed at a focal point of a lens. Either the lens or the array feeder is mechanically moved for a discretized scan for the beam of input RF signals. Whereas, in proposed approach, only an electronic phase and/or amplitude control may be needed to execute a continuous scan of the antenna elements of the feeder array 106.

The beam of input RF signals may exhibit a specific radiation pattern at a specific scan angle of the feeder array 106 with reference to the optical axis 116C of the first lens 104. For enhanced reception of the beam of input RF signals, the plane, phase and angle of incidence of the beams of input RF signals may be scanned to guide the beams of input RF signals across a desired region of the feeder array 106. The feeder array 106 may be configured to receive a linear or a non-linear delay progression of an excitation, which may correspond to the beam of input RF signals. Such linear or non-linear excitation may vary with reference to a phase, a time-delay, and an amplitude of the beam of input RF signals at the one or more scan angles across the plurality of antenna elements 108A . . . 108N.

The control circuitry 114 may be configured to electronically scan the plurality of antenna elements 108A . . . 108N of the feeder array 106 for the received lens-steered beam of RF signals. The electronic scan of the plurality of antenna elements 108A . . . 108N may further correspond to a continuous scan for the received first lens-guided beam of input RF signals across the feeder array 106 of the plurality of antenna elements 108A . . . 108N. A power or gain from the received lens-steered beam of RF signals may be initially non-uniformly distributed across the plurality of antenna elements 108A . . . 108N of the feeder array 106. Such non-uniform distribution of the gain may be attributed to a presence of a radiation surplus region or a bore sight region and a radiation deficient region or an off-bore sight region on the feeder array 106. The bore sight region may be present near an axis of symmetry, such as the optical axis 116C, of the feeder array 106 of the plurality of antenna elements 108A . . . 108N and the off-bore sight region may include the entire region of the feeder array 106 except the bore sight region of the feeder array 106. For example, for a square panel of feeder array 106, the bore sight region may be present around a center of the square panel, which may further correspond to the point of symmetry for the feeder array 106. The non-uniform distribution of the gain may be further equalized across the feeder array 106 to achieve optimal power output from the received beam of input RF signals at different scan angles for the feeder array 106. Alternatively stated, the equalization of the distribution of the gain from the received lens-guided beam of input RF signals may correspond to a distribution of a radiation pattern of the received first lens-guided beam of input RF signals from a radiation surplus region to a radiation deficient region of the feeder array 106.

One or more techniques are described herein for equalization of the distribution of the gain across the feeder array 106 of the plurality of antenna elements 108A . . . 108N. In one such technique, the control circuitry 114 may be configured to equalize the distribution of the gain from the received first lens-guided beam of input RF signals across the feeder array 106 of the plurality of antenna elements 108A . . . 108N. The distribution of the gain may be equalized based on adjustments in the phase for each of the plurality of antenna elements 108A . . . 108N of the feeder array 106 and amplitude levels for different region of the feeder array 106. Such adjustments in the phase and the amplitude levels may be achieved by use of the phase-shifters associated with each antenna element or each patch of antenna elements. For example, antenna elements in the bore sight region of the feeder array 106 may be phase aligned to receive less power from the beam of input RF signals and antenna elements in the off-bore sight region of the feeder array 106 may be phase aligned to receive more power than traditionally harnessed. Such phase-based adjustment of gain and power across the feeder array 106 may advantageously facilitate the equalized distribution of the gain across the feeder array 106.

In another technique, the first lens 104 may be used to guide the beam of input RF signals selectively across the bore sight region and the off-bore sight region of the feeder array 106. The first lens 104 may have a canonical design or a non-canonical design (i.e. a customized design) in accordance with a desired permittivity profile that may enable the first lens 104 for a continuous scan over a range of scan angles for multiple beams of input RF signals (See FIGS. 5A, 5B, 6A, and 6B). The distribution of the gain from the received first lens-guided beam of input RF signals across the feeder array 106 of the plurality of antenna elements 108A . . . 108N may be equalized based on a defined shape of the first lens 104. The defined shape of the first lens 104 may be one of a squared lens shape, a rectangular lens shape, or an arbitrary lens shape.

In some embodiments, the equalization of the gain may be achieved by shaping the first lens 104 only without the need to adjust the amplitude and phase of the feeder array 106 (at receiver end or transmitter end). In other embodiments, the distribution of the gain from the received lens-guided beam of input RF signals may be equalized based on the defined shape of the first lens 104, the defined distribution of dielectric constant within the first lens 104, and the proximity (or the arrangement) of the feeder array 106 to the first lens 104.

In a specific implementation, the first lens 104 may be suitably selected with a specific shape, such as a square-shape, to cover the feeder array 106 of the plurality of antenna elements 108A . . . 108N such that a thinner form factor for the lens-based feeder array may be obtained. Such arrangement may optimally be used to guide the beam of input RF signals equitably across the feeder array 106 of the plurality of antenna elements 108A . . . 108N.

In another technique, the dielectric constant of the first lens 104 may further be modified to selectively guide the beam of input RF signals across the plurality of antenna elements 108A . . . 108N of the feeder array 106. The dielectric constant may be modified in accordance with a desired permittivity profile, a wave front specification, such as a parallel wave front, and/or a radiation pattern for the beam of input RF signals. In accordance with an embodiment, the refractive index or the dielectric constant of the first lens 104 may be modified along a radius of the first lens 104. In such a configuration, the variation of the refractive index or the dielectric constant may be continuous or discretized (or stepwise) along the radius of the first lens 104. For example, the refractive index and the dielectric constant of a concentric dielectric lens (as shown in FIG. 3C) and a perforated dielectric lens (as shown in FIG. 3E) may vary along the radius of the concentric dielectric lens and the perforated dielectric lens. In accordance with an embodiment, the refractive index or the dielectric constant of the first lens 104 may be varied along a thickness of the first lens 104. The variation of the refractive index or the dielectric constant may be continuous or discretized (or stepwise) along the thickness of the first lens 104. For example, the refractive index and the dielectric constant of a stacked dielectric lens (as shown in FIG. 3D) may vary along the thickness of the stacked dielectric lens.

In other techniques, a defined distance between the first lens 104 and the feeder array 106 may be selected within a proximity such that the feeder array 106 may receive excitation from the beam of input RF signals at different required regions of the feeder array 106 instead at a certain point on the feeder array 106. Therefore, such an implementation may advantageously reduce a time to scan for the excitations at the feeder array 106 from the lens-guided beam of input RF signals. Further, with reduction in the spacing of the first lens 104 and the feeder array 106, a thinner form factor for the receiver 102A may be obtained for implementation in a thinner configuration of the communication device 102 (as discussed in FIG. 1B).

The received excitations at the feeder array 106 of the plurality of antenna elements 108A . . . 108N may be further transmitted as an output to the plurality of front-end RF components 112A . . . 112N of the receiver circuitry 112 electrically coupled with the feeder array 106. The output signal from each patch of antenna elements of the feeder array 106 may be processed by the plurality of front-end RF components 112A . . . 112N of the receiver circuitry 112 for optimum gain levels, noise reductions, a signal to noise ratio improvements (SNR) and signal integrity establishments (as described in FIGS. 2A and 2B).

In accordance with an embodiment, the output from the feeder array 106 may be switched from different regions of the feeder array 106 to optimally provide the gain from the received beam of input RF signals. The feeder array 106 may advantageously facilitate power switching across different regions with much fluid control over output power from the feeder array 106 as compared to a discrete set of antennas that individually receive the beam of input RF signals. In accordance with an embodiment, the output from the feeder array 106 may be further combined or summed up by the receiver circuitry 112, in conjunction with instructions from the control circuitry 114. The combined power signal from the received beam of lens-guided RF signals may further exhibit improvements in a signal to noise ratio (SNR), power levels, and signal integrity as compared to conventional approaches.

It may be noted that the disclosed LEPA configuration of the first lens 104 and the feeder array 106 has been described with regards to the receiver 102A of the communication device 102. However, the disclosed LEPA configuration may also be used in a transmitter of the communication device 102, without a deviation from the scope of the disclosure. Also, in some embodiments, a transmitter/receiver module in the receiver 102A may enable the receiver 102A to also act as a transmitter for a duplex communication. More specifically, the disclosed LEPA configuration may operate for both the transmission and reception of beams of RF signals at same or different frequencies.

Figure 2A:
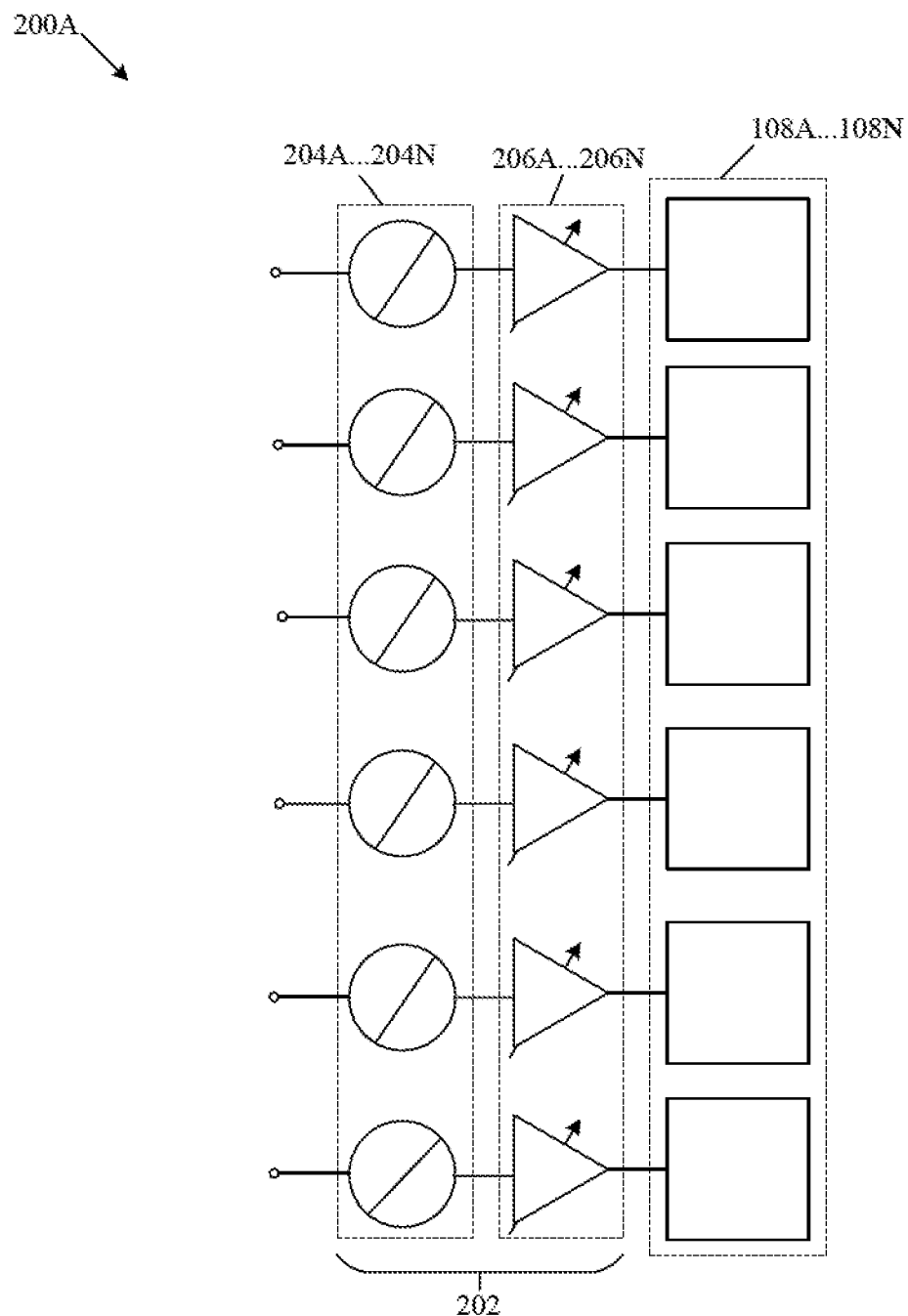
FIG. 2A illustrates an exemplary transmitter circuitry for a plurality of antenna elements of the communication device of FIG. 1A, in accordance with an exemplary embodiment of the disclosure.

FIG. 2A illustrates an exemplary transmitter circuitry for a plurality of antenna elements of the communication device of FIG. 1A, in accordance with an exemplary embodiment of the disclosure. FIG. 2A is explained in conjunction with components of FIGS. 1A to 1D. With reference to FIG. 2A, there is shown a circuit diagram of a transmitter circuitry 200A associated with the plurality of antenna elements 108A ... 108N of the feeder array 106 of the communication device 102.

The transmitter circuitry 200A may include a plurality of front-end RF components 202 for the plurality of antenna elements 108A ... 108N of the feeder array 106. The plurality of front-end RF components 202 of the transmitter circuitry 200A may include a plurality of phase-shifters 204A ... 204N and a plurality of variable gain amplifiers 206A ... 206N coupled electrically to the corresponding plurality of antenna elements 108A ... 108N. The plurality of phase-shifters 204A ... 204N may be coupled electrically to the plurality of variable gain amplifiers 206A ... 206N. The output of each front-end RF component in the transmitter circuitry 200A may correspond to an output power signal component which may be collectively equivalent to a power of a beam of RF signals transmitted via the plurality of antenna elements 108A ... 108N. Each antenna element may be a micro-strip antenna element on the substrate 110 that may be connected to a variable gain amplifier (VGA) of the plurality of variable gain amplifiers 206A ... 206N. The VGA, such as a phase-inverting variable gain amplifier (PIVGA), may be configured to provide a phase shift and a variable gain to an electrical signal that may be later on transmitted as a beam of RF signals. Each of the plurality of variable gain amplifiers 206A ... 206N may be configured to compensate for an insertion loss in each of the plurality of phase-shifters 204A ... 204N. Such connection may be followed by a connection of the VGA with a PS, such as reflection-type phase shifter (RTPS). Each PS may be configured to provide a phase shift (linear or non-linear) to a corresponding antenna element with a defined angle, such as a 180 degree phase shift. In accordance with an embodiment, the phase shift for each antenna element may be controlled electronically by use of control signals of the control circuitry 114 with reference to a reference phase, such as 0°.

For example, a feeder array 106 for the transmitter circuitry 200A may include "256" antenna elements ($A_1, A_2, A_3 \ldots A_{256}$) electrically coupled to respective "256" front-end RF chips, with each front-end RF chip having a PS and a VGA. The control circuitry 114 may provide "8-bit" phase shift signals for "$2^8$", i.e., "256" antenna elements of the feeder array 106. Each of the "8-bit" phase shift signals may correspond to a specific phase shift value for the corresponding antenna element.

In the transmitter circuitry 200A, the plurality of antenna elements of the feeder array 106 may be configured to generate a beam of RF signals that may be steered in a particular direction based on phase and amplitude adjustments of electrical signals via each VGA of the plurality of variable gain amplifiers 206A ... 206N and each PS of the plurality of phase-shifters 204A ... 204N. Also, the first lens 104 with the desired permittivity profile may enable the first lens 104 to increase directivity of one or more beams of RF signals over a range of transmission angles.

Figure 2B:
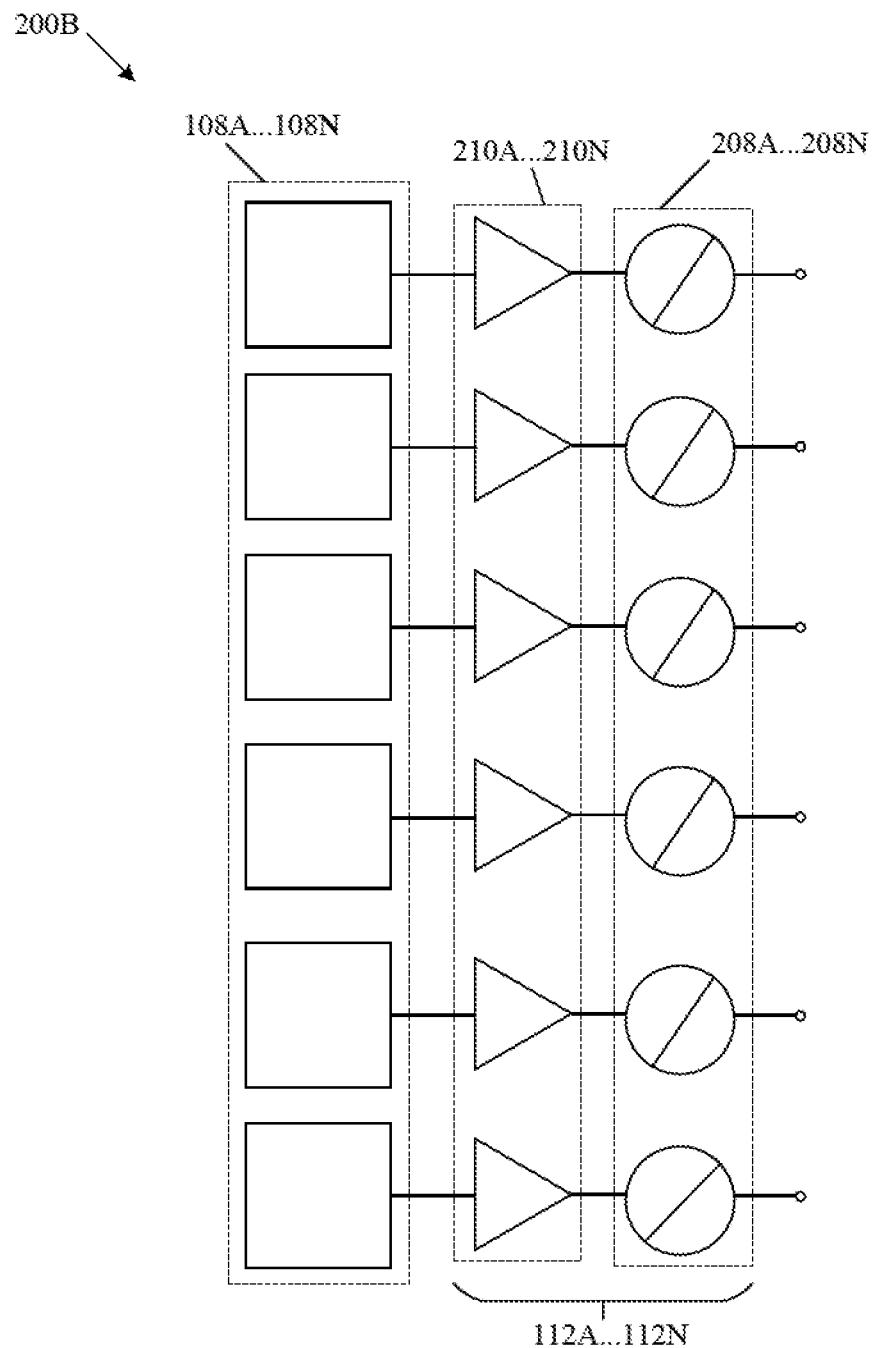
FIG. 2B illustrates an exemplary receiver circuitry for a plurality of antenna elements of the communication device of FIG. 1A, in accordance with an exemplary embodiment of the disclosure.

FIG. 2B illustrates an exemplary receiver circuitry for a plurality of antenna elements of the communication device of FIG. 1A, in accordance with an exemplary embodiment of the disclosure. FIG. 2B is explained in conjunction with components of FIGS. 2A and 1A to 1D. With reference to FIG. 2B, there is shown a circuit diagram of a receiver circuitry 200B (i.e. same as the receiver circuitry 112) associated with the plurality of antenna elements 108A ... 108N of the feeder array 106 of the communication device 102.

The receiver circuitry 200B may include the plurality of front-end RF components 112A ... 112N for the plurality of antenna elements 108A ... 108N of the feeder array 106. The plurality of front-end RF components 112A ... 112N of the receiver circuitry 112 may include a plurality of phase-shifters 208A ... 208N and a plurality of low noise amplifiers 210A ... 210N coupled electrically to the corresponding plurality of antenna elements 108A ... 108N. The plurality of phase-shifters 208A ... 208N may be electrically coupled to the plurality of the low noise amplifiers 210A ... 210N. The output of each front-end RF component in the receiver circuitry 200B may correspond to an output power signal component, which may be collectively equivalent to the received beam of input RF signals, whereas a difference between the output power signals may be reflected from amplifications and associated compensations in the gain from the implementation of the first lens 104, the amplitude and phase control of the receiver circuitry 200B and the feeder array 106.

An LNA, such as a 60-GHz variable-gain LNA, of the plurality of low noise amplifiers 210A ... 210N may be coupled with each antenna element of the plurality of antenna elements 108A ... 108N. Each antenna element may be a micro-strip antenna element on the substrate (such as the substrate 110) that may be connected to a corresponding LNA. Each of the plurality of low noise amplifiers 210A ... 210N may be configured to provide a coarse gain control, such as a 2-bit gain control, in different control stages. Such connection may be followed by a connection of the LNA with a PS, such as reflection-type phase shifter (RTPS), which may be configured to provide a phase shift to each antenna element with a defined angle, such as a "180" degree phase shift. In accordance with an embodiment, the phase shift for each antenna element may be controlled electronically by use of control signals of the control circuitry 114 with reference to a reference phase, such as 0°.

For example, a feeder array 106 of the receiver circuitry 200B may include "256" antenna elements ($A_1, A_2, A_3 \ldots A_{256}$) electrically coupled to respective "256" front-end RF chips, with each front-end RF chip having the LNA and the PS. The control circuitry 114 may provide "8-bit" phase shift signals for "$2^8$", i.e., "256" antenna elements of the feeder array 106. Each of the "8-bit" phase shift signals may correspond to a specific phase shift value for the corresponding antenna element.

Figure 3A:
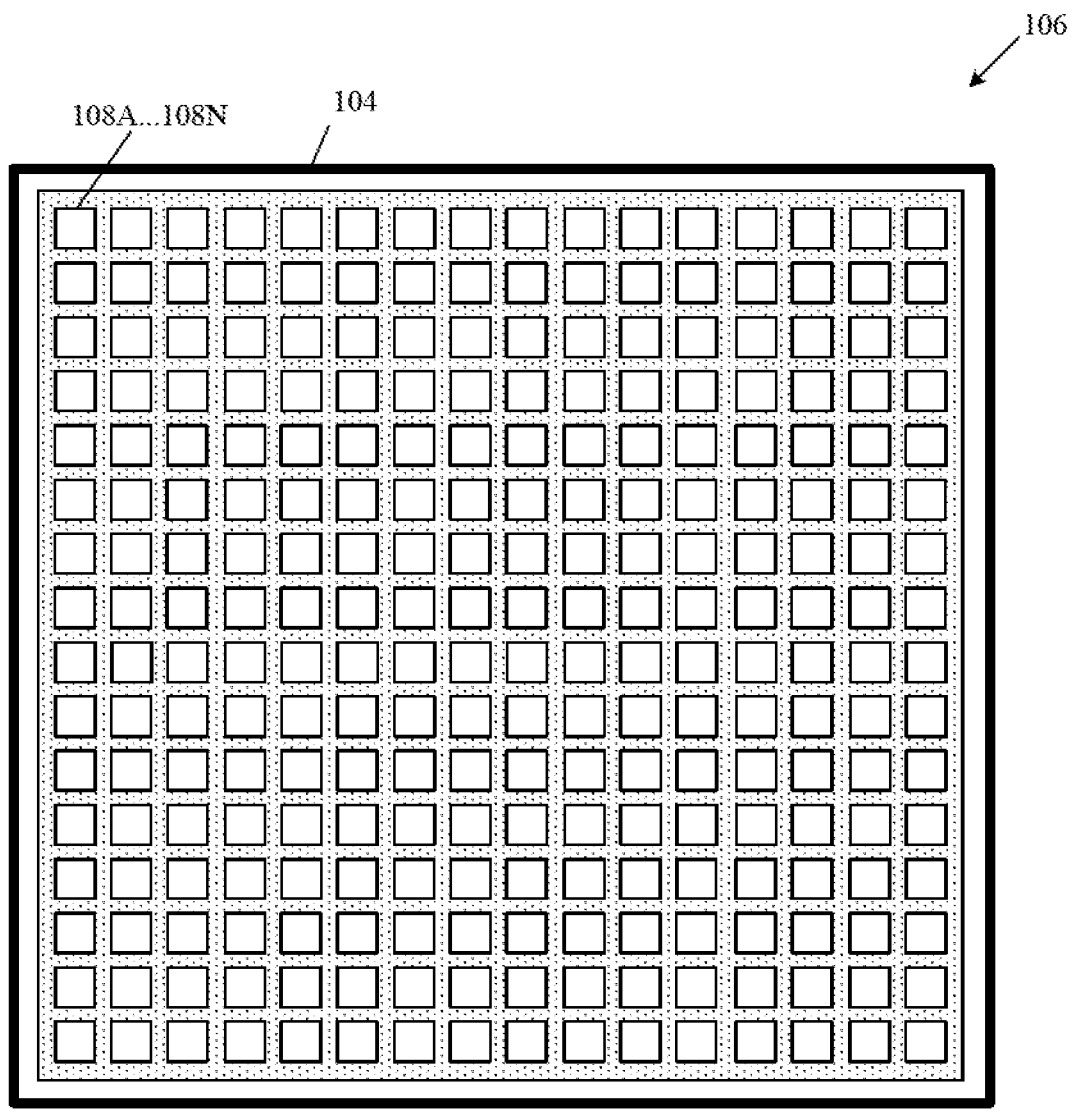
FIG. 3A illustrates an arrangement of lens over a feeder array of antenna elements, as an integrated part of the communication device of FIG. 1A, in accordance with an exemplary embodiment of the disclosure.

FIG. 3A illustrates an arrangement of lens over a feeder array of antenna elements, as an integrated part of the communication device of FIG. 1A, in accordance with an exemplary embodiment of the disclosure. FIG. 3A is explained in conjunction with FIGS. 1A to 1D, 2A, and 2B. With reference to FIG. 3A, there is shown a specific implementation of the feeder array 106 of the plurality of antenna elements 108A ... 108N with the first lens 104. In the implementation, the plurality of antenna elements 108A ... 108N may not be distributed into different sub-arrays and a single-lens LEPA configuration may be preferred for a directive guidance for the beam of input RF signals across the feeder array 106 of the plurality of antenna elements 108A . . . 108N. In accordance with an embodiment, the first lens 104 may be associated with a square geometry to cover an aperture of the feeder array 106 of the plurality of antenna elements 108A . . . 108N. In other embodiments, the first lens 104 may have suitable lens geometry to cover the aperture of the feeder array 106. The feeder array 106 may be shown as a 16×16 array of the plurality of antenna elements 108A . . . 108N, i.e., 256 antenna elements in the feeder array 106, arranged in the plane 116B that may be parallel to the principal plane 116A of the first lens 104. It may be noted that the number of antenna elements is shown to be 256; however, the number of antenna elements may be more or less than 256, without a deviation from the scope of the present disclosure. Such single-lens LEPA configuration advantageously facilitates an efficient coverage of the feeder array 106 without an increase in complexity, a decrease in a scan-angle, or a loss of a gain or a signal-integrity.

Figure 3B:
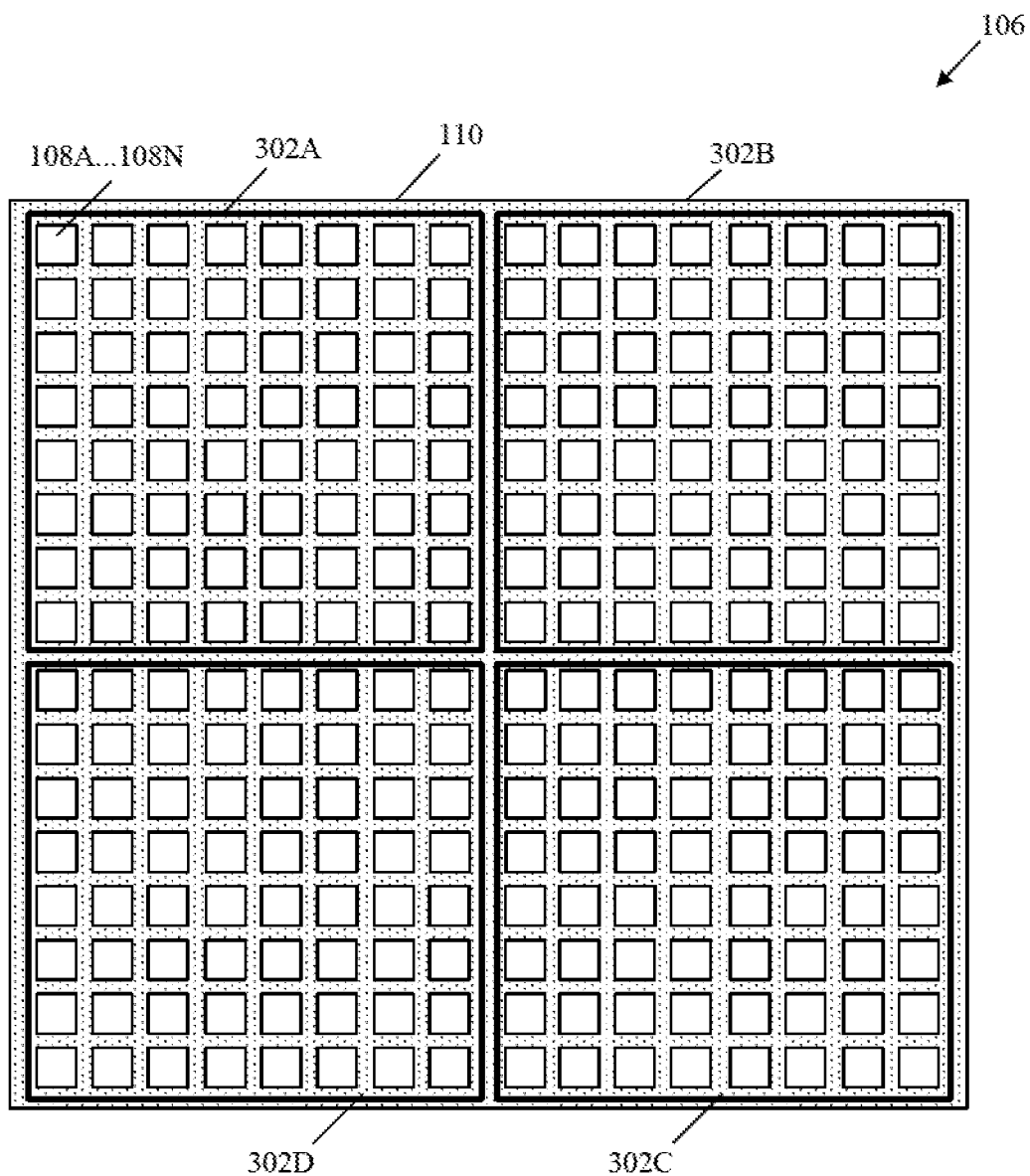
FIG. 3B illustrates another arrangement of lenses over a feeder array of antenna elements, as an integrated part of the communication device of FIG. 1A, in accordance with an exemplary embodiment of the disclosure.
Figure 3C:
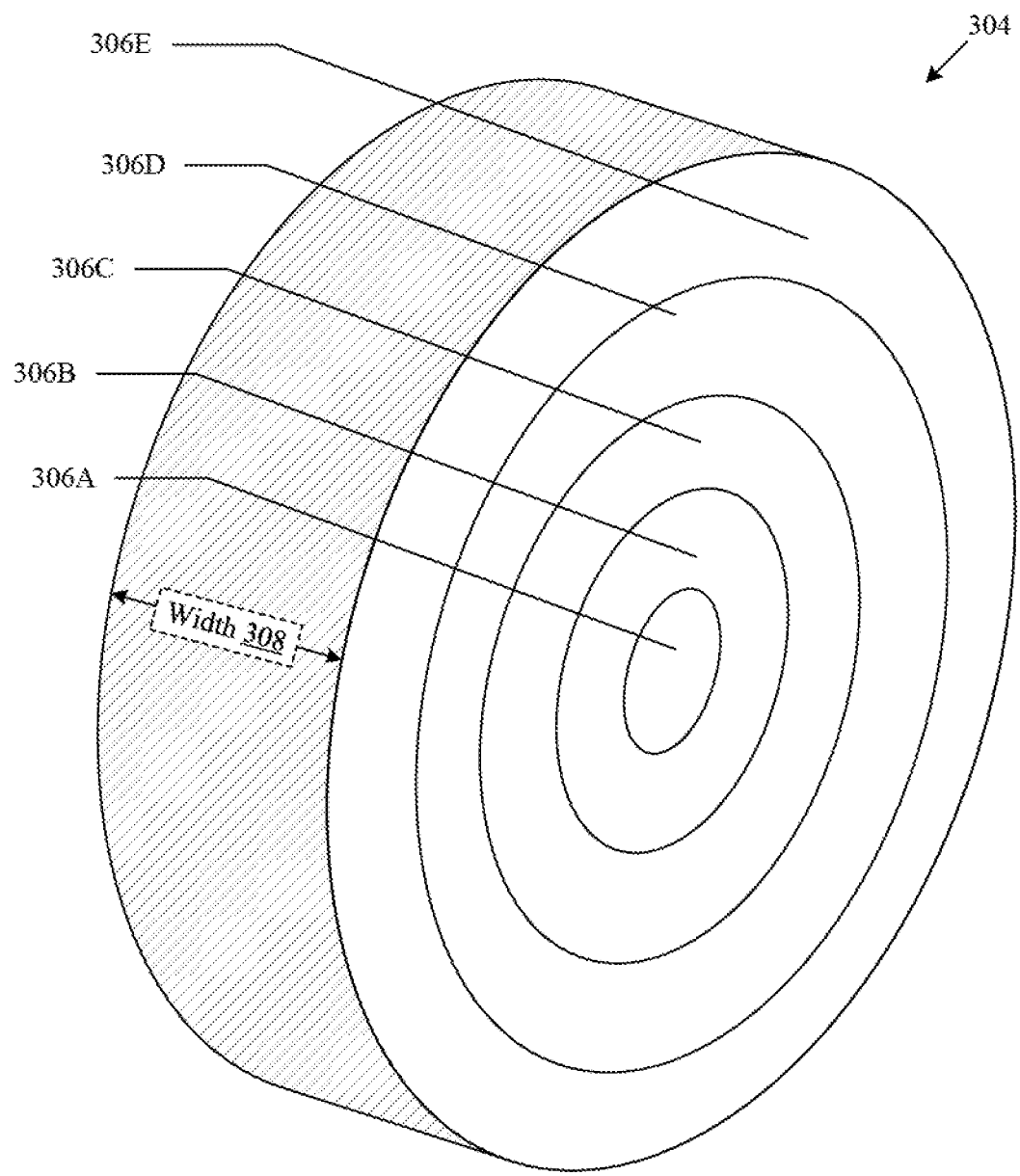
FIG. 3C illustrates a dielectric lens with an inhomogeneous distribution of dielectric constant for use in the communication device of FIG. 1A, in connection with an exemplary embodiment of the disclosure.
Figure 3D:
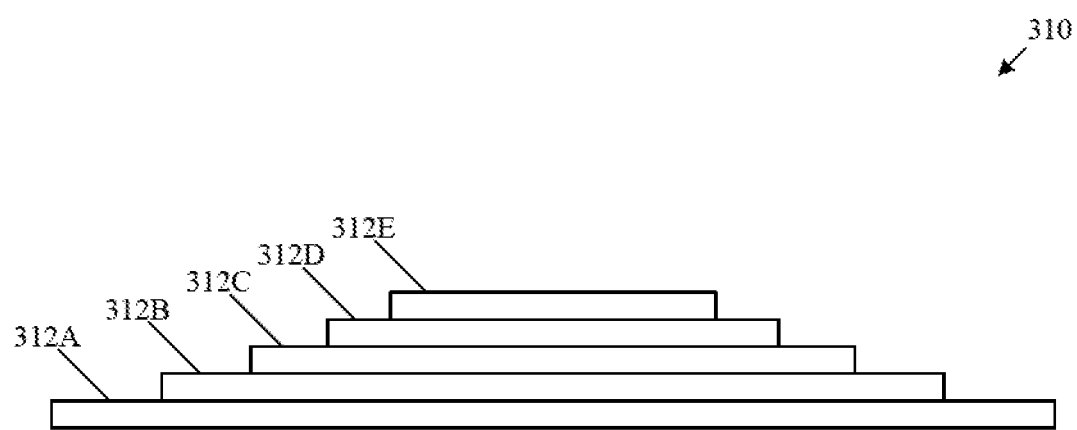
FIG. 3D illustrates a dielectric lens with stacked layers of dielectric material for use in the communication device of FIG. 1A, in connection with an exemplary embodiment of the disclosure.
Figure 3E:
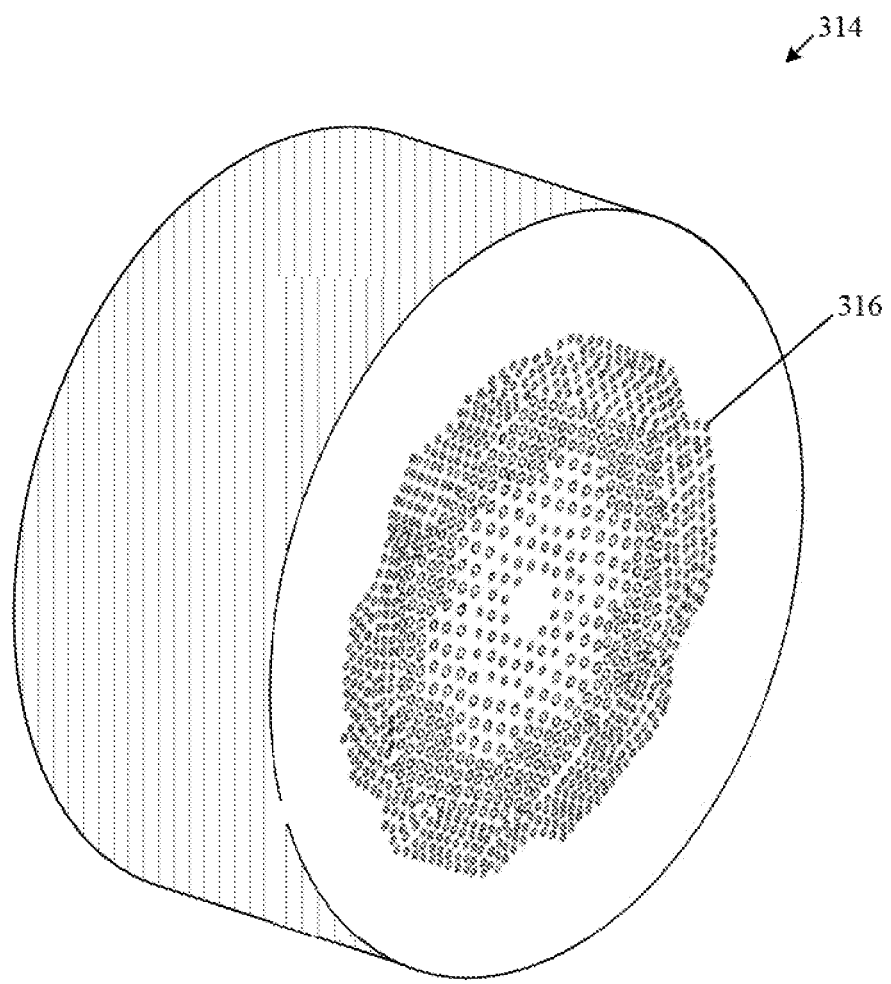
FIG. 3E illustrates a dielectric lens with perforations for use in the communication device of FIG. 1A, in connection with an exemplary embodiment of the disclosure.

FIG. 3B illustrates another arrangement of lenses over a feeder array of antenna elements, as an integrated part of the communication device of FIG. 1A, in accordance with an exemplary embodiment of the disclosure. FIG. 3A is explained in conjunction with FIGS. 1A to 1D, 2A, and 2B. With reference to FIG. 3B, there is shown an alternate implementation of a lens array of a plurality of lenses 302A-302D in conjunction with the feeder array 106 of the plurality of antenna elements 108A . . . 108N.

In such an implementation, the feeder array 106 of the plurality of antenna elements 108A . . . 108N may be partitioned into one or more sub-arrays, for example, 4 sub-arrays of 2×2 arrangements. Each of the one or more sub-arrays may comprise a defined number of antenna elements, such as each sub-array having 64 antenna elements. The plurality of lenses 302A-302D may be aligned and positioned over the one or more sub-arrays of the feeder array 106 of the plurality of antenna elements 108A . . . 108N such that each lens may specifically target a dedicated region of the feeder array 106.

In the aforementioned implementation, the feeder array 106 of 16×16 antenna elements may be partitioned into four 8×8 sub-arrays. Each of the four 8×8 sub-arrays may comprise 64 antenna elements. A lens array of "4 lenses" may be positioned above the aperture of each sub-array of the feeder array 106. In another implementation, a lens array of 2 lenses may be used to cover each of two 8×8 arrays. Therefore, the arrangement and number of lenses in the lens array may vary in number and size depending on requirements and design constraints. It may be noted that the lens array comprises 4 square lenses. However, the lens array may comprise more or less than 4 lenses of a suitable shape and a size. Such lens array-based LEPA configuration may advantageously facilitate equalization of the gain from the received beam of input RF signals across different non-uniformly excited regions of the feeder array 106. The non-uniformly excited regions of the feeder array 106 may be associated with an overall aperture of the plurality of antenna elements 108A . . . 108N that receives the beam of RF signals differentially (or non-uniformly) across different regions of the aperture of the plurality of antenna elements (108A . . . 108N), for example, a bore sight region and an off-bore sight region of the feeder array 106. Each lens of the lens array may be selectively modified to have different dielectric properties, which may further provide different angles of steer for the received beam of input RF signals.

The plurality of lenses 302A-302D in the lens array may be arranged to provide a modular solution, where each lens may cover one or more antenna modules (i.e. sub-arrays of the feeder array 106). Alternatively, a single lens may be arranged over the plurality of antenna elements 108A . . . 108N to cover the entire aperture area of the feeder array 106 (as shown in FIG. 3A). The feeder array 106 (i.e. one full phase array) may also be arranged by tiling multiple sub-arrays of antenna elements. The modularity in arrangement of lenses or sub-arrays may render a solution that may be adapted for a desired directivity, gain requirements, form factor for different device sizes, space constraints, scan-angles, gain equalization, and/or other hardware constraints.

FIG. 3C illustrates a dielectric lens with an inhomogeneous distribution of dielectric constant for use in the communication device of FIG. 1A, in connection with an exemplary embodiment of the disclosure. FIG. 3C is explained in conjunction with FIGS. 1A to 1D, 2A, 2B, 3A, and 3B. With reference to FIG. 3C, there is shown a dielectric lens 304 for use as the first lens 104 within the receiver 102A of the communication device 102.

The dielectric lens 304 may merely be an example of a type of lens that may be implemented in the receiver 102A of the communication device 102, as discussed in for example, M. Imbert, A. Papio, F. De Flaviis, L. Jofre et al, "Design and performance evaluation of a dielectric flat lens antenna for millimeter-wave applications," Antennas and Wireless Propagation Letters, IEEE, vol. 14, pp. 342-345, 2015, which is incorporated herein in their entireties by reference.

Initially, a particular permittivity profile for the dielectric lens 304 is determined. The particular permittivity profile may be used to design, select, or customize the dielectric lens 304 to achieve a desired beam steer, an optimization of multi-beam scans, a continuous scan of the feeder array 106 over a wide range of scan angles, a desired gain equalization, and a desired transmit/receive power.

The dielectric lens 304 may exhibit an inhomogeneous distribution of dielectric constant, which may vary along one or more concentric layers 306A-306E. The dielectric lens 304 may include one or more concentric layers of the one or more dielectric materials. For a five-layer dielectric lens, the one or more concentric layers 306A-306E may include a first layer 306A, a second layer 306B, a third layer 306C, a fourth layer 306D, and a fifth layer 306E of a specific dielectric material of the one or more dielectric materials. Each concentric layer of the dielectric lens 304 may be of a width 308, which may be selectively optimized to achieve desired steering angles and scan angles for the beam of input RF signals across the feeder array 106 of the plurality of antenna elements 108A . . . 108N.

Each concentric layer in the dielectric lens 304 may be made of a specific dielectric material to obtain an inhomogeneous distribution along radii of the dielectric lens 304. By use of the inhomogeneous distribution of dielectric material, the dielectric lens 304 may differentially guide the beam of input RF signals, incident at a certain scan angle, equitably across a radiation surplus region to a radiation deficient region of the feeder array 106 of the plurality of antenna elements 108A . . . 108N. Such inhomogeneous distribution of dielectric constant may facilitate equalization of the gain from the beam of input RF signals across the aperture of the feeder array 106. Whereas, conventionally the gain may be distributed significantly over the bore sight region (0° with respect to perpendicular to the plane 116B of the feeder array 106) of the feeder array 106 than on the off-bore sight region.

In a specific implementation, the dielectric lens 304 may include "5 concentric layers" of different materials with different permittivity values. Each concentric layer may be used to produce a desired phase delay in the beam of input RF signals when the dielectric lens 304 may be excited by the beam of input RF signals. Beam steering may be achieved by use of permittivity variation with each concentric layer of the dielectric lens 304.

FIG. 3D illustrates a dielectric lens with stacked layers of dielectric material for use in the communication device 102 of FIG. 1A, in connection with an exemplary embodiment of the disclosure. FIG. 3D is explained in conjunction with FIGS. 1A to 1D, 2A, 2B, and 3A to 3C. With reference to FIG. 3D, there is shown a dielectric lens 310 for use as the first lens 104 within the receiver 102A of the communication device 102.

The dielectric lens 310 may merely be an example of a type of lens that may be implemented in the receiver 102A of the communication device 102, as discussed in, for example, T. McManus, R. Mittra et al, "A comparative study of flat and profiled lenses" Antennas and Propagation Society International Symposium (APSURSI), 2012 IEEE, vol., no., pp. 1-2, 8-14 Jul. 2012, which is incorporated herein in its entirety by reference.

Initially, a particular permittivity profile for the dielectric lens 310 is determined. The particular permittivity profile may be used to design, select, or customize the dielectric lens 310 to achieve a desired beam steer, an optimization of multi-beam scans, a continuous scan of the feeder array 106 over a wide range of scan angles, a desired gain equalization, and a desired transmit/receive power.

The dielectric lens 310 may include a plurality of stacked layers 312A-312E, which may be made of one or more dielectric materials. The one or more stacked layers may include a first stacked layer 312A, a second stacked layer 312B, a third stacked layer 312C, a fourth stacked layer 312D, and a fifth stacked layer 312E of the one or more dielectric materials. Each stacked layer of the dielectric lens 310 may be of a defined thickness and may be made of a specific dielectric material. Additionally, the thickness of the dielectric lens varies discretely from center to a periphery of the dielectric lens, along a radius. The thickness of the dielectric lens 310, at any point on the radius of the dielectric lens may be equal to an arithmetic sum of the corresponding thickness for each vertically stacked layer of the dielectric material. The thickness of the dielectric lens 310 may be selectively optimized for achieving desired directive steering of the beam of input RF signals across the feeder array 106 of the plurality of antenna elements 108A . . . 108N.

Each stacked layer in the dielectric lens 310 may be made of a specific dielectric material to obtain a dielectric distribution along a depth or a thickness of the dielectric lens 310. The dielectric lens 310 may differentially guide the beam of input RF signals, incident at a certain scan angle, equitably across a radiation surplus region to a radiation deficient region of the feeder array 106 of the plurality of antenna elements 108A . . . 108N. Such distribution of dielectric constant may facilitate equalization of gain incident on the aperture of the feeder array 106. Whereas, conventionally the gain may be distributed significantly over a bore sight region (0° with respect to perpendicular to the plane 116B of the feeder array 106) than on the off-bore sight region of the feeder array 106.

FIG. 3E illustrates a dielectric lens with perforations for use in the communication device 102 of FIG. 1A, in connection with an exemplary embodiment of the disclosure. FIG. 3E is explained in conjunction with FIGS. 1A to 1D, 2A, 2B, and 3A to 3D. With reference to FIG. 3E, there is shown a perforated dielectric lens 314 for use as the first lens 104 within the receiver 102A of the communication device 102.

The perforated dielectric lens 314 may merely be an example of a type of lens that may be implemented in the receiver 102A of the communication device 102, as discussed in for example, M. Imbert, A. Papio, F. De Flaviis, L. Jofre et al, "Design and performance evaluation of a dielectric flat lens antenna for millimeter-wave applications," Antennas and Wireless Propagation Letters, IEEE, vol. 14, pp. 342-345, 2015, which is incorporated herein in their entireties by reference.

Initially, a particular permittivity profile for the perforated dielectric lens 314 may be determined. The particular permittivity profile may be used to design, select, or customize the perforated dielectric lens 314 to achieve a desired beam steer, an optimization of multi-beam scans, a continuous scan of the feeder array 106 over a wide range of scan angles, a desired gain equalization, and a desired transmit/receive power.

The perforated dielectric lens 314 may include a homogeneous distribution of dielectric constant that varies with each of a plurality of perforations 316. The homogenous variation in the dielectric constant may be obtained from a lattice of perforations in a dielectric slab or a cylinder such that each perforation may include a dielectric, such as air. An overall permittivity and the dielectric constant for each corresponding perforation may be varied from a non-perforated region to a perforated region of the perforated dielectric lens 314.

In some cases, a relative permittivity for each perforation on a single layer of a substrate of the perforated dielectric lens 314 may be associated with a diameter of each perforation and a distance between each neighboring perforation. The distribution of relative permittivity values for the perforated dielectric lens 314 may be varied based on adjustments of the diameter and the distance between the neighboring perforations. The perforated dielectric lens 314 may correspond to a Fresnel lens with each perforation corresponding to a Fresnel zone in the perforated dielectric lens 314 and therefore, such perforations may facilitate a beam scan in multiple planes and at higher scan angles as compared to planar uniform flat lens.

Figure 3F:
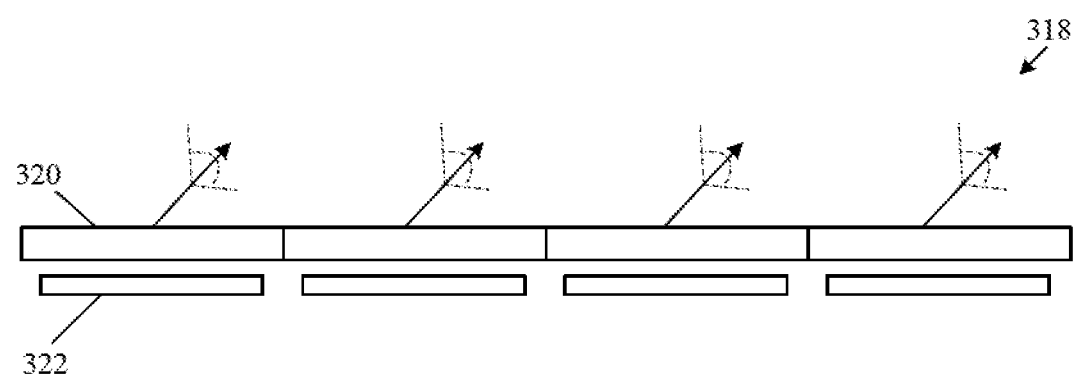
FIG. 3F illustrates an off-centered lens for use in the communication device of FIG. 1A, in connection with an exemplary embodiment of the disclosure.

FIG. 3F illustrates an off-centered lens for use in the communication device 102 of FIG. 1A, in accordance with an exemplary embodiment of the disclosure. FIG. 3F is explained in conjunction with FIGS. 1A to 1D, 2A, 2B, and 3A to 3E. With reference to FIG. 3F, there is shown an off-centered lens 318 as first lens 104 within the receiver 102A of the communication device 102.

Initially, a particular permittivity profile for the off-centered lens 318 may be determined. The particular permittivity profile may be used to design, select, or customize the off-centered lens 318 to achieve a desired beam steer, an optimization of multi-beam scans, a continuous scan of the feeder array 106 over a wide range of scan angles, a desired gain equalization, and a desired transmit/receive power.

The off-centered lens 318 may include one or more mechanically titled modules 322 associated with a substrate 320. The one or more mechanically titled modules 322 may be configured to provide a corresponding angular offset to the received first lens-steered beam of input RF signals for the feeder array 106 of the plurality of antenna elements 108A . . . 108N. The angular offset obtained from each of the one or more mechanically titled modules 322 may be utilized to set the off-centered lens 318 for a specific scan angle for an incident beam of RF signals from a specific angle of incidence. Additionally, the off-centered lens 318 may facilitate an equalized distribution of the input beam of RF signals across the feeder array 106 of the plurality of antenna elements 108A . . . 108N 308A . . . 308N based on guidance of the beam of input RF signals equitably across the radiation surplus region and the radiation deficient region of the feeder array 106.

Figure 4A:
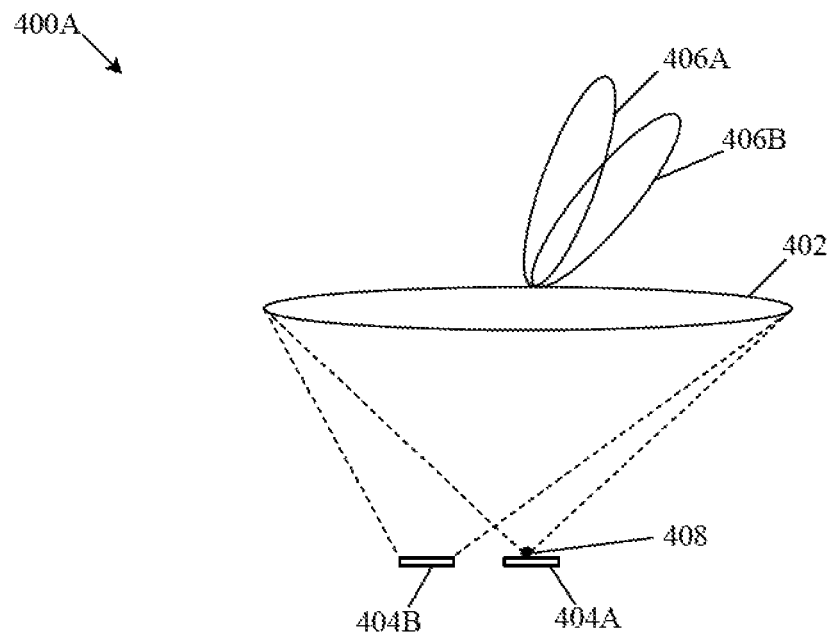
FIG. 4A illustrates a conventional arrangement of lens-based antennas for discretized scanning of antenna elements of a conventional communication device.

FIG. 4A illustrates a conventional arrangement of lens-based antennas for discretized scanning of antenna elements of a conventional communication device. With reference to FIG. 4A, there is shown a conventional arrangement 400A of lens-based antennas of receivers/transmitters of a conventional communication device.

In the conventional arrangement 400A, there is shown a lens 402 arranged over a first antenna element 404A, and a second antenna element 404B. The lens 402 may be a canonical lens, such as a convex lens. The first antenna element 404A and the second antenna element 404B may be separate phase array antennas on a common substrate or a different substrate. The conventional arrangement 400A of the lens 402, the first antenna element 404A, and the second antenna element 404B may be implemented in one of or both a receiver and transmitter of the conventional communication device.

In the conventional arrangement 400A, the first antenna element 404A and the second antenna element 404B may be at a distance that is equal to the focal length of the lens 402. Each antenna element may receive a different beam of input RF signal, such as a beam 406A for the first antenna element 404A and a beam 406B for the second antenna element 404B. In order to scan for a corresponding beam of input RF signals at the aperture of antenna elements, the lens 402 may need to be shifted such that an individual antenna element (such as the first antenna element 404A) is at a focal point 408 of the lens 402. This may create a discontinuity while scanning of the individual antenna element, such as the first antenna element 404A or the second antenna element 404B. Also, with a discontinuous scan, the overall scanning time may also increase which may lead to a delay in TX/RX of data at the receiver/transmitter end of the conventional communication device. Also, an overall gain from the received beam of input RF signals may be lower than a desired gain due to a delay caused by the discontinuous scan.

Figure 4B:
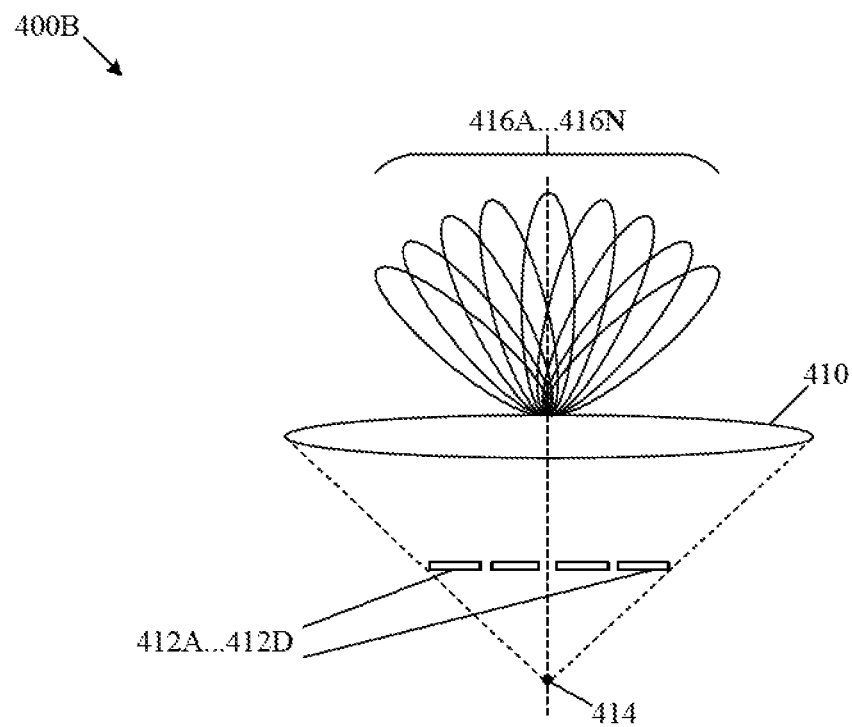
FIG. 4B illustrates an exemplary lens-based feeder array for continuous scanning of phase array antenna elements of the communication device of FIG. 1A, in accordance with an embodiment of the disclosure.

FIG. 4B illustrates an exemplary lens-based feeder array arrangement for continuous scanning of phase array antenna elements of the communication device of FIG. 1A, in accordance with an embodiment of the disclosure. FIG. 4A is explained in conjunction with FIGS. 1A to 1D, 2A, 2B, and 3A to 3F. With reference to FIG. 4A, there is shown an exemplary lens-based feeder array arrangement 400B of the communication device 102.

In the exemplary lens-based feeder array arrangement 400B, there is shown a lens 410 and a feeder array of antenna elements 412A . . . 412D present proximal to the lens 410, as compared to the conventional arrangement 400A of FIG. 4A. The lens 410 may be same as the lens 402 or may be a non-canonical lens of a customized shape and a desired permittivity profile. The feeder array of antenna elements 412A . . . 412D may be present at the defined distance from the lens 410. The defined distance is less than the focal length (i.e. a distance from a focal point 414) of the lens 410. Alternatively, the defined distance may be greater than the focal length of the lens 410.

The exemplary lens-based feeder array arrangement 400B supports a multi-beam scan of RF signals at the feeder array of antenna elements 412A . . . 412D. The exemplary lens-based feeder array arrangement 400B may provide a solution to scan a plurality of beams 416A . . . 416N over a wide range of scan angles. The plurality of beams 416A . . . 416N may be scanned based on a control over phase and amplitude parameters for each antenna element of the feeder array of antenna elements 412A . . . 412D. This may facilitate a continuous scan without a need to physically move the lens 410 or the feeder array of antenna elements 412A . . . 412D. Also, in some cases, the lens 410 may have a permittivity profile that may help to guide each beam of the plurality of beams 416A . . . 416N to a particular antenna element or a sub-array of antenna elements of the feeder array of antenna elements 412A . . . 412D.

Figure 5A:
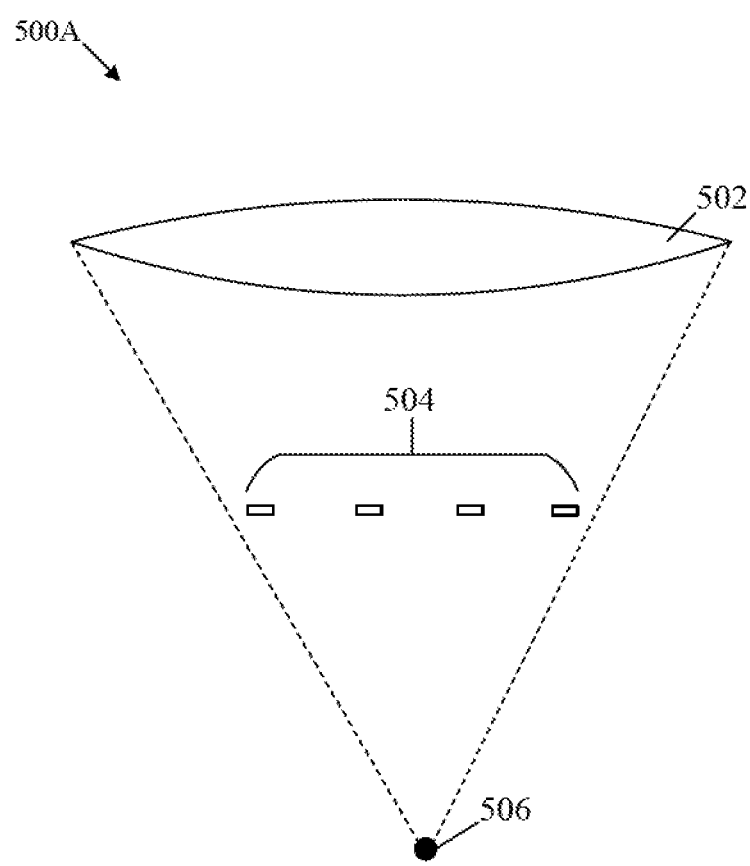
FIG. 5A illustrates an exemplary lens enhanced phase array (LEPA) configuration for the communication device of FIG. 1A, in accordance with an embodiment of the disclosure.

FIG. 5A illustrates an exemplary lens enhanced phase array (LEPA) configuration for the communication device of FIG. 1A, in accordance with an embodiment of the disclosure. FIG. 5A is explained in conjunction with elements from FIGS. 1A to 1D, 2A, 2B, and 3A to 3F. With reference to FIG. 5A, there is shown an exemplary LEPA configuration 500A.

In the exemplary LEPA configuration 500A, there is shown a dielectric lens 502 and a feeder array of antenna elements 504 proximal to the dielectric lens 502 by a defined distance that may be less than the focal length (i.e. from a focal point 506) of the dielectric lens 502. The dielectric lens 502 may be an example of the first lens 104 for use in the communication device 102. The dielectric lens 502 may have a canonical lens shape, such as a convex aperture and a rectangular shape, and a permittivity profile that facilitates a multi-beam scan across a wide range of scan angles. The feeder array of antenna elements 504 may be phase array antennas on a substrate, with each phase array antenna spaced apart from a neighboring phase array antenna by a distance, such as "$\lambda/2$". Here, $\lambda$ is the wavelength of a beam of RF signals.

Figure 5B:
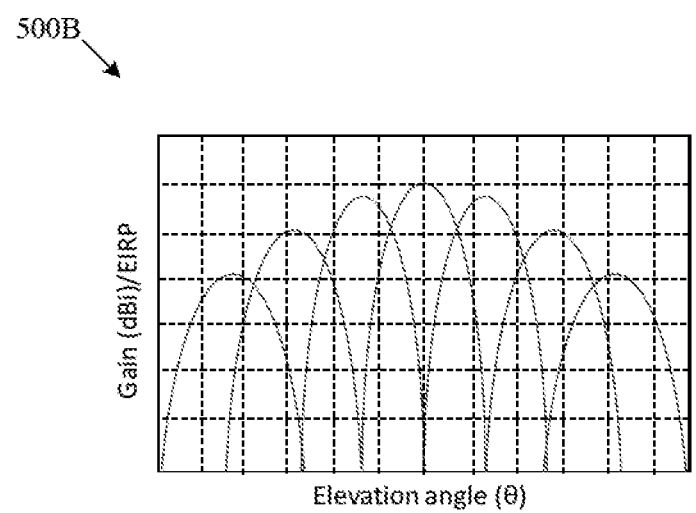
FIG. 5B illustrates an exemplary plot of radiation pattern of multiple beams across a range of scan angles for the exemplary lens enhanced phase array (LEPA) configuration of FIG. 5A, in accordance with an embodiment of the disclosure.

The exemplary LEPA configuration 500A facilitates a continuous scan for multiple beams of RF signals incident on the aperture of the feeder array of antenna elements 504 from different incident angles (or directions). Multiple peaks in Equivalent Isotropically Radiated Power (EIRP, in decibel-meter or dBm) may be observed based on a continuous scan for multiple beams of RF signals across the feeder array of antenna elements 504. The exemplary LEPA configuration 500A may include features, given as follows:

1. Shape of the dielectric lens 502 that causes generation of a near flat scanning response (in terms of peaks of EIRP, as shown in FIG. 5B).
2. Permittivity profile that facilitates equalization of gain across different regions of the feeder array of antenna elements 504.
3. Distance of the dielectric lens 502 from the feeder array of antenna elements 504 that leads to a thinner form factor for the exemplary LEPA configuration 500A.

FIG. 5B illustrates an exemplary plot of radiation pattern of multiple beams across a range of scan angles for the exemplary lens enhanced phase array (LEPA) configuration of FIG. 5B, in accordance with an embodiment of the disclosure. FIG. 5B is explained in conjunction with elements from FIGS. 1A to 1D, 2A, 2B, 3A to 3F, and 5A.

In FIG. 5B, there is shown an exemplary plot 500B of a radiation pattern of multiple beams across a range of scan angles for the dielectric lens 502 proximal to the feeder array of antenna elements 504. The exemplary plot 500B is between EIRP values for different beams of RF signals versus angles (i.e. angle in degrees) that represents different directions for TX/RX of multiple beams of RF signals. The EIRP values may correspond to product of a power (in dB)

of a transmitter circuitry (such as the transmitter circuitry 200A) and an antenna gain in a particular direction (measured in the angles).

As shown, the exemplary plot 500B includes multiple peaks at different angles, i.e. for different directions of antenna gain based on a continuous scan of multiple beams of RF signals. Each beam may correspond to a different direction or different scan angle. The scanning response (measured from a pattern of peaks in the exemplary plot 500B) appears to be nearly flat at "35 dBm". More specifically, the scanning response remains flat for a specific range of angles, such as in a range of "−30 to +30" degrees and decreases for other angles. The angles (or directions in which antenna gain is measured) spans from "−90 degrees to +90" degrees, i.e. a total of "180" degrees. Thus, the exemplary LEPA configuration 500A may help to scan the beams at wider range of scan angles as compared to conventional approaches. The dielectric lens 502 may further help to steer beams (or distribute the beams across the feeder array of antenna elements 504) at different angles (even in off-axis directions) to achieve desired antenna gain and/or directivity.

Figure 6A:
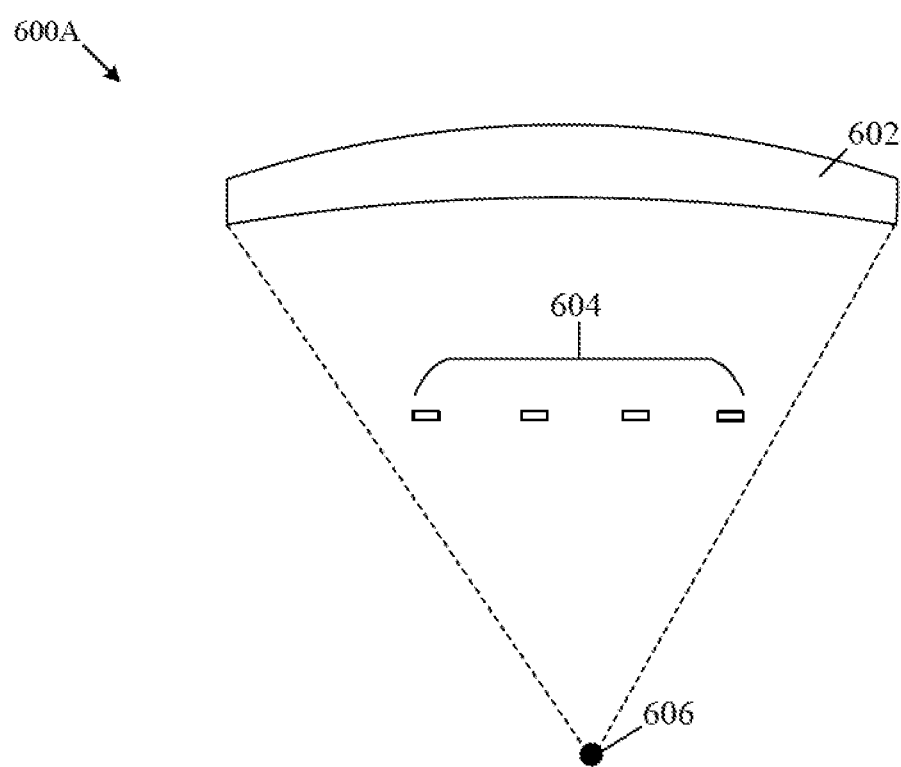
FIG. 6A illustrates an exemplary lens enhanced phase array (LEPA) configuration for the communication device of FIG. 1A, in accordance with an embodiment of the disclosure.

FIG. 6A illustrates an exemplary lens enhanced phase array (LEPA) configuration for the communication device of FIG. 1A, in accordance with an embodiment of the disclosure. With reference to FIG. 6A, there is shown an exemplary LEPA configuration 600A.

Figure 6B:
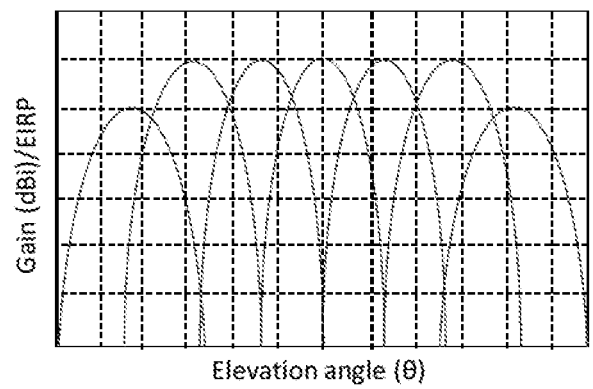
FIG. 6B illustrates an exemplary plot of radiation pattern of beams across a range of scan angles for a lens customized for the exemplary lens enhanced phase array (LEPA) configuration of FIG. 6A, in accordance with an embodiment of the disclosure.

In the exemplary LEPA configuration 600A, there is shown a shaped dielectric lens 602 and a feeder array of antenna elements 604 proximal to the shaped dielectric lens 602 by a defined distance that may be less than the focal length (i.e. from a focal point 606) of the shaped dielectric lens 602. The shaped dielectric lens 502 may be an example of the first lens 104 for use in the communication device 102. The shaped dielectric lens 602 may have a non-canonical lens shape, such as homogeneous hemi elliptic (or hemispherical) lens shape, and a non-canonical aperture. The shaped dielectric lens 602 may be designed as per a desired permittivity profile. The desired permittivity profile may facilitate a multi-beam scan and a flat scanning response (as shown in FIG. 6B) across a wide range of scanned angles. The feeder array of antenna elements 604 may be phase array antennas on a substrate, with each phase array antenna spaced apart from a neighboring phase array antenna by a distance, such as "λ/2". Here, λ is the wavelength of a beam of RF signals.

The exemplary LEPA configuration 600A facilitates a continuous scan for multiple beams of RF signals incident on the aperture of the feeder array of antenna elements 604 from different incident angles (or directions). Multiple peaks in EIRP values may be observed based on a continuous scan for multiple beams of RF signals across the feeder array of antenna elements 604. The exemplary LEPA configuration 600A may employ features, given as follows:

1. Customized lens shape for the shaped dielectric lens 602 that causes generation of the flat scanning response (in terms of peaks of EIRP, as shown in FIG. 6B).
2. Custom Permittivity profile that facilitates equalization of gain across different regions of the feeder array of antenna elements 604 and no degradation of directivity for off-axis feeds of power).
3. Distance of the shaped dielectric lens 602 from the feeder array of antenna elements 604 that leads to a thinner form factor for the exemplary LEPA configuration 600A.

In some cases, the exemplary LEPA configuration 600A may employ a joint optimization of the lens shape and parameters associated with the feeder array of antenna elements 604. The joint optimization may lead to a minimization of directivity degradation for off-axis feeds (or beams of RF signals). The feeder array of antenna elements 604 may be designed with a stable beam profile for all feeds (with no or minimum directivity degradation for off-axis feeds of beams of RF signals). Such design may help to efficiently focus beams of RF signals that propagate parallel to a lens axis, on the feeder array of antenna elements 604. Also, the design may enable a direct mount of the shaped dielectric lens 602 on a dielectric substrate of a desired form factor.

The exemplary LEPA configuration 600A may be suitable up to K-band ("18 to 27 GHz") but may be less suitable for higher frequencies due to integration complexity of the shaped dielectric lens 602 and the feeder array of antenna elements 604 in a given form factor. The exemplary LEPA configuration 600A may exhibit an improved performance due to a suppression of the side-lobe levels and reduction of the off-axis distortion of beams of RF signals. The performance of the feeder array of antenna elements 604 for the exemplary LEPA configuration 600A may depend on whether the shaped dielectric lens 602 gets illuminated by a uniformly-spaced array of non-identical feeds (i.e. beams of RF signals) or an array of non-identical feeds.

FIG. 6B illustrates an exemplary plot of radiation pattern of beams across a range of scan angles for a lens customized for the exemplary lens enhanced phase array (LEPA) configuration of FIG. 6A, in accordance with an embodiment of the disclosure. FIG. 6B is explained in conjunction with elements from FIGS. 1A to 1D, 2A, 2B, 3A to 3F, and 6A.

In FIG. 6B, there is shown an exemplary plot 600B of a radiation pattern of multiple beams across a range of scan angles for the shaped dielectric lens 602 proximal to the feeder array of antenna elements 604. The exemplary plot 600B is between EIRP values for different beams of RF signals versus scanned angles (i.e. a scanned angle in degrees) that represents different directions for TX/RX of multiple beams of RF signals. The EIRP values may correspond to product of a power (in dB) of a transmitter circuitry (such as the transmitter circuitry 200A) and an antenna gain in a particular direction (measured as the scanned angles).

As shown, the exemplary plot 600B includes multiple peaks at different scanned angles, i.e. for different directions of antenna gain based on a continuous scan of multiple beams of RF signals. Each beam may correspond to a different direction or a different scanned angle. The scanning response (measured from a pattern of peaks) appears flat at "40 dBm". More specifically, the scanning response remains flat for few scanned angles, such as for a range of "−20 to +20" degrees. The scanned angles spans from "−90 degrees to +90" degrees, i.e. a total of "180" degrees. Thus, the exemplary LEPA configuration 600A may help to scan the beams at wider range of scan angles as compared to conventional approaches. The shaped dielectric lens 602 may further help to steer beams (or distribute the beams across the feeder array of antenna elements 604) at different angles (even in off-axis directions) to achieve desired antenna gain and/or directivity.

Figure 7:
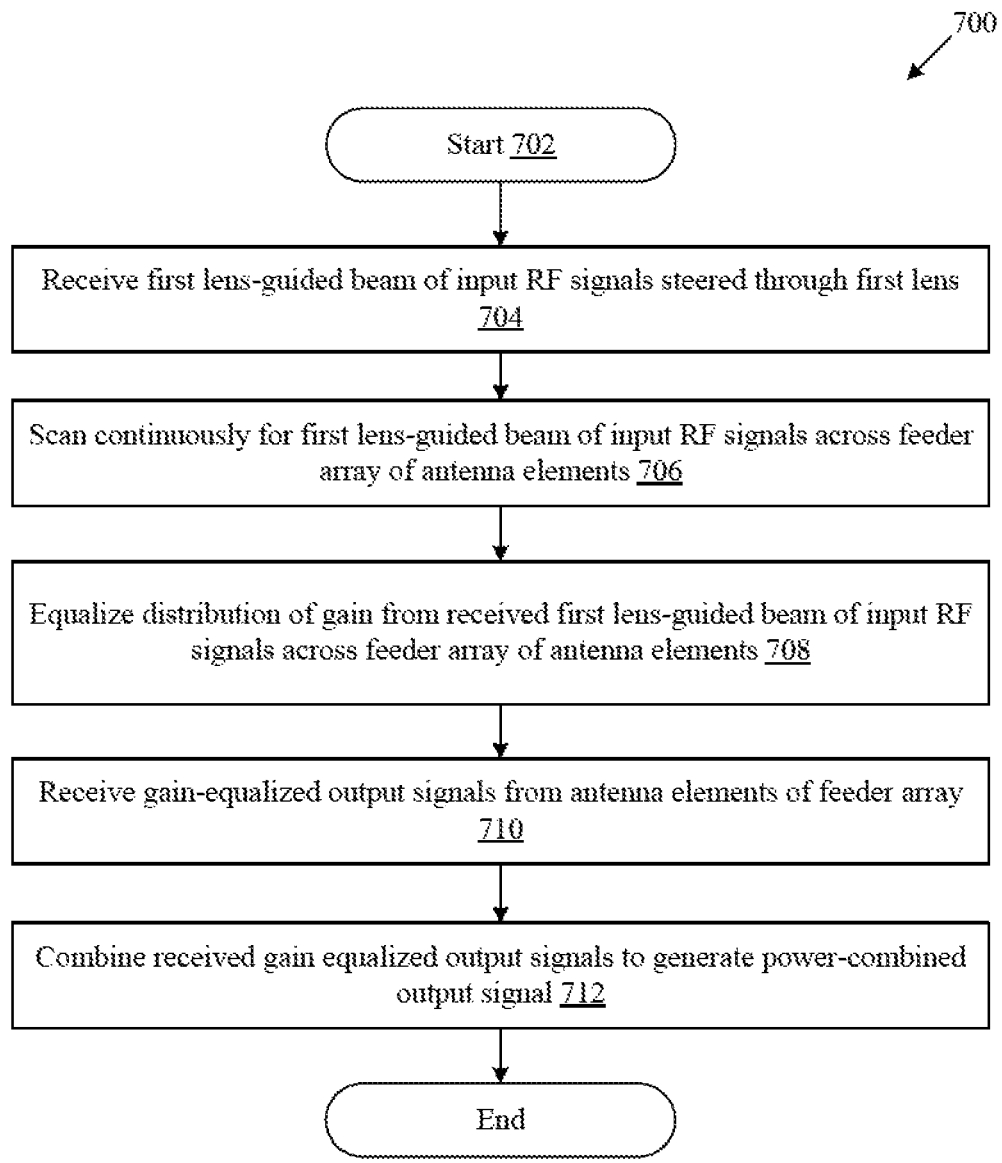
FIG. 7 is a flow chart that illustrates exemplary operations for equalized distribution of received input RF signals across feeder array of the communication device, in accordance with an exemplary embodiment of the disclosure.

FIG. 7 is a flow chart that illustrates exemplary operations for equalized distribution of received input RF signals across feeder array of the communication device, in accordance with an exemplary embodiment of the disclosure. FIG. 7 is explained in conjunction with FIGS. 1A to 1D, 2A, 2B, and 3A to 3F. With reference to FIG. 7, there is shown a flow chart 700 that includes exemplary operations from 702 through 712. The exemplary operations gain-equalized reception of input RF signals via the exemplary receiver may start at 702 and proceed to 704.

At 704, the first lens 104 guided beam of input RF signals steered through the first lens 104. The feeder array 106 of the plurality of antenna elements 108A . . . 108N may be configured to receive the first lens-guided beam of input RF signals through the first lens 104. Such reception of the beam of input RF signals may further be done in conjunction with a phase and amplitude control of the control circuitry 114.

At 706, continuous scan for the received first lens-guided beam of input RF signals may be performed across the feeder array 106 of the plurality of antenna elements 108A . . . 108N. The control circuitry 114 may be configured to continuously scan for the received first lens-guided beam of input RF signals across the feeder array 106. Such continuous scan may be facilitated by use of phase array antennas instead of single antennas for reception of the beam of input RF signals.

At 708, distribution of gain for the received first lens 104 guided beam of input RF signals may be equalized across the feeder array 106 of the plurality of antenna elements 108A . . . 108N. In one implementation, the first lens 104 may equalize the distribution of the gain of the received first lens 104 guided beam of input RF signals across the feeder array 106 of the plurality of antenna elements 108A . . . 108N. In other implementation, the control circuitry 114 may be configured to equalize the distribution of the gain of the received first lens 104 guided beam of input RF signals across the feeder array 106 of the plurality of antenna elements 108A . . . 108N.

At 710, gain-equalized output signal may be received from the plurality of antenna elements 108A . . . 108N of the feeder array 106. The receiver circuitry 112 may be configured to receive the gain-equalized output signals from the plurality of antenna elements 108A . . . 108N of the feeder array 106.

At 712, the received gain equalized output signal may be combined to generate a power-combined output signal obtain an output signal. A power combiner in the receiver circuitry 112 may be configured to combine the received gain equalized output signals to generate a power-combined output signal. Control passes to end.

Figure 8:
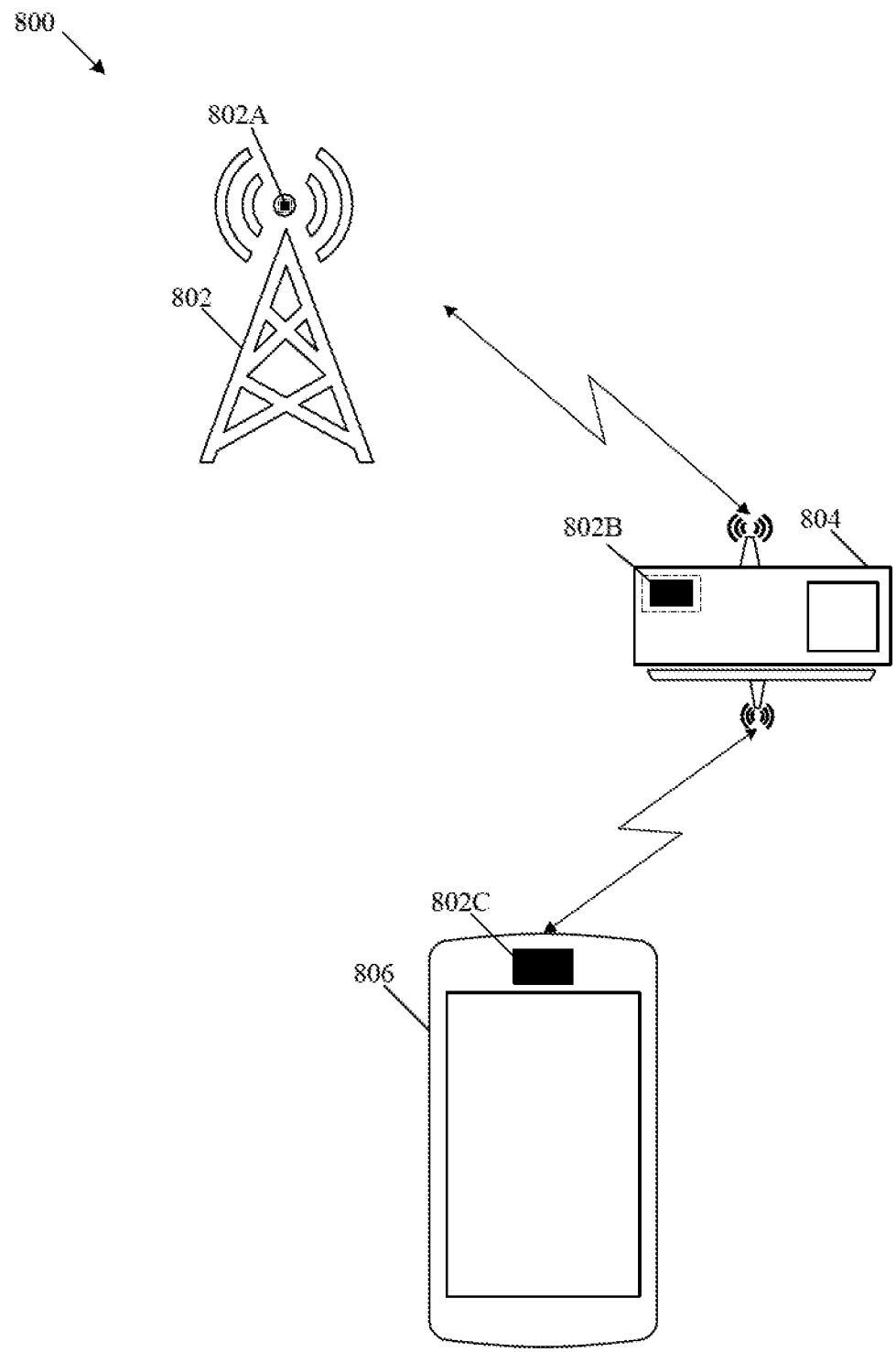
FIG. 8 depicts a communication setup that illustrates operation of the communication device of FIG. 1A with other signaling sources/sinks, in accordance with an exemplary embodiment of the disclosure.

FIG. 8 illustrates an exemplary communication environment for a transmission and a reception of RF communication signals, in accordance with an exemplary embodiment of the disclosure. FIG. 8 is explained in conjunction with FIGS. 1A to 1D, 2A, 2B, 3A to 3F, and 7. With reference to FIG. 8, there is shown an exemplary communication environment 800 that includes a base station 802, a repeater 804, and a smartphone 806, communicatively coupled to at least the repeater 804 and the base station 802 through the RF communication signals.

The base station 802 may correspond to an electronic assembly of a Base Transceiver Station (BTS) and a Base Station Controller (BSC) for generation, transmission and reception of the RF communication signals from different signal sources and sinks. One of such signal sources/sinks may be the smartphone 806 that may be present in a line-of-sight (LOS) or a non-line-of-sight (NLOS) region of the base station 802. The repeater 804 may be further present within the LOS or NLOS region of the base station 802 or the smartphone 806, and therefore, the repeater 804 may receive and boost the RF communication signals transmitted from at least the smartphone 806 and the base station 802 of the exemplary communication environment 800.

In an implementation, the base station 802 may implement the receiver 102A, which may be configured to receive RF input beams at different scan angles, and equalize the distribution of the received RF input beams across the feeder array 106 of the plurality of antenna elements 108A . . . 108N. The base station 802 may be configured to receive and process the RF input beams from either of the LOS or the NLOS regions of the signal sources/sinks. Further, the implementation of the receiver 102A with the feeder array 106 of antenna elements facilitates the base station 802 to switch to a specific sub-array of the feeder array 106 to receive RF input beams from specific incident angle. The use of feeder array 106 in the receiver 102A of the base station 802 may advantageously facilitate continuous scanning of the feeder array 106 of the plurality of antenna elements 108A . . . 108N, and therefore, may reduce a delay in scanning the one or more beams of the RF signals across the aperture of the feeder array 106. In such an implementation, the base station 802 may be a 4G or a 5th 5G base station to facilitate TX/RX of 4G or 5G RF communication signals.

In another implementation, the repeater 804 may implement the receiver 102A, which may be configured to receive RF input beams from different scan angles, and equalize the distribution of the received RF input beams across the feeder array 106 of the plurality of antenna elements 108A . . . 108N. The repeater 804 may be configured to receive and process the RF input beams from either of the LOS or the NLOS regions of the signal sources/sinks. Further, the implementation of the receiver 102A with the feeder array 106 of antenna elements facilitates the receiver 102A to switch to a specific sub-array of the feeder array 106 to receive RF input beams from specific incident angle. The use of feeder array 106 in the receiver 102A of the repeater 804 may advantageously facilitate continuous scanning of the feeder array 106 of the plurality of antenna elements 108A . . . 108N, and therefore, may reduce a delay in scanning the one or more beams of the RF signals across the aperture of the feeder array 106. In such an implementation, the repeater 804 may be a 4G or a 5G repeater to facilitate TX/RX of 4G or 5G RF communication signals.

In yet another implementation, the smartphone 806 may implement the receiver 102A, which may be configured to receive RF input beams from different scan angles, and equalize the distribution of the received RF input beams across the feeder array 106 of the plurality of antenna elements 108A . . . 108N. The smartphone 806 may be configured to receive and process the RF input beams from either of the LOS or the NLOS regions of the signal sources/sinks. Further, the implementation of the receiver 102A with the feeder array 106 of antenna elements facilitates the receiver 102A to switch to a specific sub-array of the feeder array 106 to receive RF input beams from specific incident angle. The use of feeder array 106 in the receiver 102A of the smartphone 806 may advantageously facilitate continuous scanning of the feeder array 106 of the plurality of antenna elements 108A . . . 108N, and therefore, may reduce a delay in scanning the one or more beams of the RF signals across the aperture of the feeder array 106. In such an implementation, the smartphone 806 may be a 4G or a 5G smartphone to facilitate TX/RX of 4G or 5G RF communication signals.

The present disclosure provides several advantages over prior arts. The present disclosure provides a solution to improve power gain for the received beam of RF signals without an increase in the area of the feeder array 106 or a number of antenna elements in the feeder array 106. The use of different lens configurations, with different shapes, sizes and geometries advantageously facilitates beam scanning at wider angles and a beam steering for desired regions of the feeder array 106. Such advantageous use may further facilitate equalized distribution of received RF power from RF signals at the feeder array 106 of the receiver 102A. The current LEPA configuration of the receiver 102A facilitates robust communication for millimeter wave communications and at frequency bands and data rates that support the 4G and 5G standards. The proximity of the first lens 104 and the feeder array 106 in the LEPA configuration further renders a thinner form-factor for the receiver 102A and the communication device 102, which advantageously reduces a thickness of the communication device 102 and further mitigate design constraints for such receivers. By use of phase array antennas with such proximity to the feeder array 106, a continuous scan for excitations from the beam of RF signals can be done at the feeder array 106 instead of a discretized scan for each individual antenna element in current solutions.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g., computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analogue-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A communication device, comprising:
   a first lens having a defined distribution of dielectric constant;
   a feeder array comprising a plurality of antenna elements that are positioned in proximity to the first lens to receive a first lens-guided beam of input radio frequency (RF) signals through the first lens; and
   control circuitry configured to modify a dielectric constant of the first lens to equalize a distribution of a gain of input RF signals across the feeder array of the plurality of antenna elements.

2. The communication device according to claim 1, wherein the control circuitry is further configured to continuously scan for the received first lens-guided beam of input RF signals across the feeder array of the plurality of antenna elements.

3. The communication device according to claim 1, wherein the control circuitry is further configured to equalize the distribution of the gain based on adjustments in a phase and an amplitude of the received first lens-guided beam of input RF signals.

4. The communication device according to claim 1, wherein the distribution of the gain from the received first lens-guided beam of input RF signals across the feeder array of the plurality of antenna elements is equalized based on a defined shape of the first lens.

5. The communication device according to claim 1, wherein a defined shape of the first lens is one of a squared lens shape, a rectangular lens shape, or an arbitrary lens shape.

6. The communication device according to claim 1, wherein the control circuitry is further configured to equalize distribution of a radiation pattern of the received first lens-guided beam of input RF signals from a radiation surplus region to a radiation deficient region of the feeder array for the equalized distribution of the gain from the received first lens-guided beam of input RF signals across the feeder array of the plurality of antenna elements.

7. The communication device according to claim 1, the first lens includes at least one of a defined geometry profile, a defined refractive index profile, and a defined radiation profile.

8. The communication device according to claim 7, wherein the defined geometry profile of the first lens corresponds to a physical configuration based on a thickness, a length, a beam diameter, a radius of curvature, and an arrangement of at least one aperture of the first lens.

9. The communication device according to claim 7, wherein:
   a dielectric profile of first lens is modified based on modification of the dielectric constant of the first lens,
   the defined dielectric profile of the first lens corresponds to the distribution of the dielectric constant within the first lens, and
   the defined dielectric profile is based on at least the dielectric constant, a permittivity, and a variation in concentration of at least one dielectric material in at least one component of the first lens.

10. The communication device according to claim 7, wherein the defined refractive index profile of the first lens corresponds to a distribution of refractive index along a radial, a principal, or a defined plane of the first lens.

11. The communication device according to claim 7, wherein the defined radiation profile of the first lens corresponds to a transformation of a radiation pattern or a beam shape over at least one aperture of the first lens.

12. The communication device according to claim 1, wherein the equalization of the gain of the input RF signals is based on a proximity of the feeder array of the plurality of antenna elements from the first lens, wherein the proximity of the feeder array of the plurality of antenna elements to the first lens corresponds to a defined distance of the feeder array from the first lens, and wherein the defined distance is less than a focal length of the first lens.

13. The communication device according to claim 12, wherein the defined distance is equal to or greater than the focal length of the first lens.

14. The communication device according to claim 1, wherein the first lens is a dielectric lens with an inhomogeneous distribution of the dielectric constant that varies along at least one concentric layer of at least one dielectric material.

15. The communication device according to claim 1, wherein the first lens is a perforated dielectric lens with a homogeneous distribution of the dielectric constant that varies in accordance with each perforation of a plurality of perforations in the first lens.

16. The communication device according to claim 1, wherein the first lens is a dielectric lens with a plurality of stacked layers, wherein the plurality of stacked layers are arranged such that the distribution of the gain from the received lens-guided beam of input RF signals is equalized across the feeder array of the plurality of antenna elements.

17. The communication device according to claim 1, wherein the first lens is an off-centered lens with at least one mechanically titled module to provide a corresponding angular offset to receive a beam of input RF signals for the feeder array of the plurality of antenna elements.

18. The communication device according to claim 1, wherein the first lens is positioned such that a first beam of input RF signals that passes through the first lens is guided as the first lens-guided beam of input RF signals across the feeder array of the plurality of antenna elements.

19. The communication device according to claim 1, further comprises a plurality of lenses positioned over a plurality of sub-arrays of the feeder array such that each of the plurality of lenses is aligned along an axis that is orthogonal to a plane of the feeder array.

20. The communication device according to claim 1, further comprises receiver circuitry that is configured to combine the received first lens-guided beam of input RF signals at the feeder array of the plurality of antenna elements to obtain a feeder output signal.

21. The communication device according to claim 1, wherein the feeder array is positioned in a plane such that an axis of the first lens is orthogonal to the plane of the feeder array.

22. The communication device of claim 1, wherein the dielectric constant is modified based on a desired permittivity profile, and a wave front specification, wherein the dielectric constant of the first lens may be modified along a radius of the first lens.

23. The communication device of claim 1, wherein the control circuitry is configured to equalize the gain distribution such that the gain from a radiation pattern of the received first lens-guided beam in a radiation surplus region is less than the gain of a radiation pattern of the received first lens-guided beam of input RF signals in a radiation deficient region.

24. A method, comprising:
in a communication device that comprises a first lens having a defined distribution of dielectric constant:
receiving, by a feeder array of the communication device, a first lens-guided beam of input radio frequency (RF) signals through the first lens, wherein the feeder array comprises a plurality of antenna elements positioned in proximity to the first lens; and
modifying, by control circuitry of the communication device, a dielectric constant of the first lens to equalize a distribution of a gain of input RF signals across the feeder array of the plurality of antenna elements.

25. The method according to claim 24, further comprising scanning, by the control circuitry, the first lens-guided beam of input RF signals across the feeder array of the plurality of antenna elements.

26. The method of claim 24, wherein the dielectric constant is modified based on a desired permittivity profile, and a wave front specification, wherein the dielectric constant of the first lens may be modified along a radius of the first lens.

\* \* \* \* \*